(12) United States Patent
Hing et al.

(10) Patent No.: US 10,139,613 B2
(45) Date of Patent: Nov. 27, 2018

(54) DIGITAL MICROSCOPE AND METHOD OF SENSING AN IMAGE OF A TISSUE SAMPLE

(75) Inventors: Paul Hing, Owingen-Billafingen (DE); Christian Romer, Constance (DE); Sven Hensler, Gaienhofen (DE)

(73) Assignee: SAKURA FINETEK U.S.A., INC., Torrance, CA (US)

( * ) Notice: Subject to any disclaimer, the term of this patent is extended or adjusted under 35 U.S.C. 154(b) by 658 days.

(21) Appl. No.: 13/212,955

(22) Filed: Aug. 18, 2011

(65) Prior Publication Data
US 2012/0044342 A1 Feb. 23, 2012

Related U.S. Application Data

(60) Provisional application No. 61/375,703, filed on Aug. 20, 2010.

(51) Int. Cl.
*H04N 7/18* (2006.01)
*H04N 9/47* (2006.01)
*G02B 21/36* (2006.01)

(52) U.S. Cl.
CPC ......... *G02B 21/367* (2013.01); *G02B 21/361* (2013.01); *G02B 21/365* (2013.01)

(58) Field of Classification Search
CPC ... G02B 21/361; G02B 21/365; G02B 21/367
USPC .......................................................... 348/79
See application file for complete search history.

(56) References Cited

U.S. PATENT DOCUMENTS

| 3,309,262 A | 3/1967 | Copeland et al. |
|---|---|---|
| 3,525,803 A | 8/1970 | Smart |
| 3,762,798 A | 10/1973 | Grubb et al. |
| 3,765,851 A | 10/1973 | White |
| 3,862,909 A | 1/1975 | Copeland |

(Continued)

FOREIGN PATENT DOCUMENTS

| CA | 2504245 | 11/2006 |
|---|---|---|
| CN | 102782557 | 11/2012 |

(Continued)

OTHER PUBLICATIONS

Sakura Finetek U.S.A., Inc., Chinese second office action dated Dec. 27, 2013 for CN201080017649.4.

(Continued)

*Primary Examiner* — Jessica M Prince
(74) *Attorney, Agent, or Firm* — William Thomas Babbitt; Leech Tishman Fuscaldo & Lampl, Inc.

(57) ABSTRACT

A method including sensing an image without magnification of a portion of a tissue sample; displaying the sensed image on a display; and performing at least one of the following: refreshing a sensed image at a predetermined rate, storing the sensed image, modifying the sensor to display pixel ratio, and sensing a magnified view of an area of the portion of the tissue sample. A digital microscope comprising: at least one image sensor; a first optic configured to project an image with a magnification of one or less; a second optic disposed between the at least one sensor and the stage, the second optic configured to project an image with a magnification greater than one; and a computer operable to direct an image capture by the at least one image sensor of a portion of a microslide on the stage projected through the first optic or the second optic.

50 Claims, 11 Drawing Sheets

(56) References Cited

U.S. PATENT DOCUMENTS

| | | | |
|---|---|---|---|
| 4,000,417 A | 12/1976 | Adkisson et al. | |
| 4,079,248 A | 3/1978 | Lehureau et al. | |
| 4,089,989 A | 5/1978 | White et al. | |
| 4,148,752 A | 4/1979 | Burger et al. | |
| 4,404,683 A | 9/1983 | Kobayashi et al. | |
| 4,673,988 A | 6/1987 | Jansson et al. | |
| 4,684,799 A | 8/1987 | Emoto et al. | |
| 4,760,385 A * | 7/1988 | Jansson | G02B 21/367 345/641 |
| 4,761,075 A | 8/1988 | Matsushita et al. | |
| 4,836,667 A | 6/1989 | Ozeki | |
| 4,849,177 A | 7/1989 | Jordan | |
| 4,962,264 A | 10/1990 | Forester | |
| 5,180,606 A | 1/1993 | Stokes et al. | |
| 5,287,272 A | 2/1994 | Rutenberg et al. | |
| 5,297,034 A | 3/1994 | Weinstein | |
| 5,297,215 A | 3/1994 | Yamagishi | |
| 5,311,426 A | 5/1994 | Donohue et al. | |
| 5,428,690 A | 6/1995 | Bacus et al. | |
| 5,473,706 A | 12/1995 | Bacus et al. | |
| 5,532,874 A | 7/1996 | Stein | |
| 5,546,323 A | 8/1996 | Bacus et al. | |
| 5,561,556 A | 10/1996 | Weissman et al. | |
| 5,581,637 A | 12/1996 | Cass et al. | |
| 5,655,028 A | 8/1997 | Soll et al. | |
| 5,659,174 A | 8/1997 | Kaneoka et al. | |
| 5,675,141 A | 10/1997 | Kukihara | |
| 5,686,960 A | 11/1997 | Sussman et al. | |
| 5,768,033 A | 6/1998 | Brock | |
| 5,793,969 A | 8/1998 | Kamentsky et al. | |
| 5,836,877 A | 11/1998 | Zavislan | |
| 5,864,138 A | 1/1999 | Miyata et al. | |
| 5,891,619 A | 4/1999 | Zakim et al. | |
| 5,924,074 A | 6/1999 | Evans | |
| 5,947,167 A | 9/1999 | Bogen et al. | |
| 6,031,930 A | 2/2000 | Bacus et al. | |
| 6,061,176 A | 5/2000 | Shih | |
| 6,078,681 A | 6/2000 | Silver | |
| 6,091,842 A | 7/2000 | Domanik et al. | |
| 6,101,265 A | 8/2000 | Bacus et al. | |
| 6,147,797 A | 11/2000 | Lee | |
| 6,205,235 B1 | 3/2001 | Roberts | |
| 6,208,374 B1 | 3/2001 | Clinch | |
| 6,215,892 B1 | 4/2001 | Douglass et al. | |
| 6,226,352 B1 | 5/2001 | Salb | |
| 6,226,392 B1 | 5/2001 | Bacus et al. | |
| 6,248,995 B1 | 6/2001 | Tanaami et al. | |
| 6,272,235 B1 | 8/2001 | Bacus et al. | |
| 6,309,607 B1 | 10/2001 | Johnston et al. | |
| 6,396,941 B1 | 5/2002 | Bacus et al. | |
| 6,404,906 B2 | 6/2002 | Bacus et al. | |
| 6,466,690 B2 | 10/2002 | Bacus et al. | |
| 6,522,774 B1 | 2/2003 | Bacus et al. | |
| 6,529,271 B1 | 3/2003 | Engelhardt | |
| 6,606,413 B1 | 8/2003 | Zeineh | |
| 6,671,393 B2 | 12/2003 | Hays et al. | |
| 6,674,881 B2 | 1/2004 | Bacus et al. | |
| 6,674,884 B2 | 1/2004 | Bacus et al. | |
| 6,678,398 B2 | 1/2004 | Wolters et al. | |
| 6,684,092 B2 | 1/2004 | Zavislan | |
| 6,711,283 B1 | 3/2004 | Soenksen | |
| 6,735,531 B2 | 5/2004 | Rhett et al. | |
| 6,775,402 B2 | 8/2004 | Bacus et al. | |
| 6,800,249 B2 | 10/2004 | de la Torre-Bueno | |
| 6,800,853 B2 | 10/2004 | Ohkura | |
| 6,834,237 B2 | 12/2004 | Noergaard et al. | |
| 6,847,481 B1 | 1/2005 | Ludl et al. | |
| 6,847,729 B1 | 1/2005 | Clinch et al. | |
| 6,947,583 B2 | 9/2005 | Ellis et al. | |
| 6,959,720 B2 | 11/2005 | Kurihara et al. | |
| 6,982,741 B2 | 1/2006 | Fiedler | |
| 6,993,169 B2 | 1/2006 | Wetzel et al. | |
| 7,009,638 B2 | 3/2006 | Gruber et al. | |
| 7,016,109 B2 | 3/2006 | Nakagawa | |
| 7,027,627 B2 | 4/2006 | Levin et al. | |
| 7,031,507 B2 | 4/2006 | Bacus et al. | |
| 7,071,969 B1 | 7/2006 | Stimson | |
| 7,098,634 B1 | 8/2006 | Yu | |
| 7,110,586 B2 | 9/2006 | Bacus et al. | |
| 7,110,645 B2 | 9/2006 | Birk et al. | |
| 7,133,545 B2 | 11/2006 | Douglass et al. | |
| 7,136,518 B2 * | 11/2006 | Griffin | A61B 5/0059 345/629 |
| 7,141,802 B2 | 11/2006 | Takeyama et al. | |
| 7,146,372 B2 | 12/2006 | Bacus et al. | |
| 7,149,332 B2 | 12/2006 | Bacus et al. | |
| 7,171,030 B2 | 1/2007 | Foran et al. | |
| 7,194,118 B1 | 3/2007 | Harris et al. | |
| 7,212,660 B2 | 5/2007 | Wetzel et al. | |
| 7,224,839 B2 | 5/2007 | Zeineh | |
| 7,233,340 B2 | 6/2007 | Hughes et al. | |
| 7,248,403 B2 | 7/2007 | Nakagawa | |
| 7,250,963 B2 * | 7/2007 | Yuri | G02B 21/365 348/79 |
| 7,292,251 B1 | 11/2007 | Gu | |
| 7,349,482 B2 | 3/2008 | Kim | |
| 7,359,548 B2 | 4/2008 | Douglass et al. | |
| 7,391,894 B2 | 6/2008 | Zeineh | |
| 7,394,482 B2 | 7/2008 | Olschewski | |
| 7,394,979 B2 | 7/2008 | Luther et al. | |
| 7,396,508 B1 | 7/2008 | Richards et al. | |
| 7,400,342 B2 | 7/2008 | Gaida et al. | |
| 7,400,983 B2 | 7/2008 | Feingold et al. | |
| 7,406,215 B2 | 7/2008 | Clune et al. | |
| 7,421,102 B2 | 9/2008 | Wetzel et al. | |
| 7,426,345 B2 | 9/2008 | Takamatsu et al. | |
| 7,428,325 B2 | 9/2008 | Douglass et al. | |
| 7,433,026 B2 | 10/2008 | Wolpert et al. | |
| 7,456,377 B2 | 11/2008 | Zeineh et al. | |
| 7,463,761 B2 | 12/2008 | Eichhorn et al. | |
| 7,470,541 B2 | 12/2008 | Copeland et al. | |
| 7,482,600 B2 | 1/2009 | Seyfried | |
| 7,483,554 B2 | 1/2009 | Kotsianti et al. | |
| 7,486,329 B2 * | 2/2009 | Endo | 348/345 |
| 7,502,519 B2 | 3/2009 | Eichhorn et al. | |
| 7,542,596 B2 | 6/2009 | Bacus et al. | |
| 7,584,019 B2 | 9/2009 | Feingold et al. | |
| 7,596,249 B2 | 9/2009 | Bacus et al. | |
| 7,602,524 B2 | 10/2009 | Eichhorn et al. | |
| 7,623,697 B1 | 11/2009 | Hughes et al. | |
| 7,630,113 B2 | 12/2009 | Sase et al. | |
| 7,633,616 B2 | 12/2009 | Hing | |
| 7,642,093 B2 | 1/2010 | Tseung et al. | |
| 7,653,300 B2 | 1/2010 | Fujiyoshi et al. | |
| 7,657,070 B2 | 2/2010 | Lefebvre | |
| 7,663,078 B2 | 2/2010 | Virag et al. | |
| 7,677,289 B2 | 3/2010 | Hayworth et al. | |
| 7,689,024 B2 | 3/2010 | Eichhorn et al. | |
| 7,738,688 B2 | 6/2010 | Eichhorn et al. | |
| 7,756,309 B2 | 7/2010 | Gholap et al. | |
| 7,756,357 B2 | 7/2010 | Yoneyama | |
| 7,778,485 B2 | 8/2010 | Zeineh et al. | |
| 7,822,257 B2 | 10/2010 | Endo et al. | |
| 7,840,300 B2 | 11/2010 | Harker | |
| 7,856,131 B2 | 12/2010 | Bacus et al. | |
| 7,860,292 B2 | 12/2010 | Eichhorn et al. | |
| 7,864,414 B2 | 1/2011 | Sase et al. | |
| 7,869,641 B2 | 1/2011 | Wetzel et al. | |
| 7,873,193 B2 | 1/2011 | De La Torre-Bueno et al. | |
| 7,876,948 B2 | 1/2011 | Wetzel et al. | |
| RE42,220 E | 3/2011 | Clinch et al. | |
| 7,901,941 B2 | 3/2011 | Tseung et al. | |
| 7,912,267 B2 | 3/2011 | Kawano et al. | |
| 7,916,916 B2 | 3/2011 | Zeineh | |
| 7,920,163 B1 * | 4/2011 | Kossin | 348/81 |
| 7,925,067 B2 | 4/2011 | Bacus et al. | |
| 7,944,608 B2 | 5/2011 | Hayashi et al. | |
| 7,949,161 B2 | 5/2011 | Kawanabe et al. | |
| 7,957,057 B2 | 6/2011 | Sase et al. | |
| 7,967,057 B2 | 6/2011 | Kunii et al. | |
| 7,978,894 B2 | 7/2011 | Soenksen et al. | |
| 8,000,560 B2 | 8/2011 | Shirota | |
| 8,000,562 B2 | 8/2011 | Morales et al. | |
| 8,036,868 B2 | 10/2011 | Zeineh et al. | |

(56) References Cited

U.S. PATENT DOCUMENTS

| | | |
|---|---|---|
| 8,074,547 B2 | 12/2011 | Ito et al. |
| 8,077,959 B2 | 12/2011 | Dekel et al. |
| 8,085,296 B2 * | 12/2011 | Yuguchi et al. ............... 348/82 |
| 8,094,902 B2 * | 1/2012 | Crandall ............ G02B 21/002 |
| | | 382/128 |
| 8,094,914 B2 | 1/2012 | Iki et al. |
| 8,098,279 B2 | 1/2012 | Sase et al. |
| 8,098,956 B2 | 1/2012 | Tatke et al. |
| 8,103,082 B2 | 1/2012 | Olson et al. |
| 8,125,534 B2 | 2/2012 | Shimonaka |
| 8,159,547 B2 | 4/2012 | Kawashima |
| 8,174,763 B2 | 5/2012 | Guiney et al. |
| 8,187,536 B2 | 5/2012 | Graupner et al. |
| 8,199,358 B2 | 6/2012 | Eichhorn et al. |
| 8,203,575 B2 | 6/2012 | Molnar et al. |
| 8,283,176 B2 | 10/2012 | Bland et al. |
| 8,305,434 B2 | 11/2012 | Nakatsuka et al. |
| 8,306,298 B2 | 11/2012 | Bacus et al. |
| 8,306,300 B2 | 11/2012 | Bacus et al. |
| 8,339,703 B2 | 12/2012 | Knebel |
| 8,350,904 B2 | 1/2013 | Fujimoto et al. |
| 8,366,857 B2 | 2/2013 | Hayworth et al. |
| 8,385,619 B2 | 2/2013 | Soenksen |
| 8,385,686 B2 | 2/2013 | Sano |
| 8,388,891 B2 | 3/2013 | Lefebvre |
| 8,394,635 B2 | 3/2013 | Key et al. |
| 8,396,669 B2 | 3/2013 | Cocks |
| 8,463,741 B2 | 6/2013 | Ehike et al. |
| 8,473,035 B2 | 6/2013 | Frangioni |
| 8,476,585 B2 | 7/2013 | Galloway |
| 8,501,435 B2 | 8/2013 | Gustafsson et al. |
| 8,565,480 B2 | 10/2013 | Eichhorn et al. |
| 8,565,503 B2 | 10/2013 | Eichhorn et al. |
| 8,582,489 B2 | 11/2013 | Eichhorn et al. |
| 8,582,849 B2 | 11/2013 | Eichhorn et al. |
| 8,673,642 B2 | 3/2014 | Key et al. |
| 8,687,858 B2 | 4/2014 | Walter et al. |
| 8,725,237 B2 | 5/2014 | Bryant-Greenwood et al. |
| 8,730,315 B2 | 5/2014 | Yoneyama |
| 8,744,213 B2 | 6/2014 | Tatke et al. |
| 8,747,746 B2 | 6/2014 | Lefebvre |
| 8,771,978 B2 | 7/2014 | Ragan |
| 8,788,217 B2 | 7/2014 | Feingold et al. |
| 8,796,038 B2 | 8/2014 | Williamson, IV et al. |
| 8,827,760 B2 | 9/2014 | Ushibo et al. |
| 2001/0035752 A1 | 11/2001 | Kormos et al. |
| 2002/0169512 A1 | 11/2002 | Stewart |
| 2002/0176160 A1 | 11/2002 | Suzuki et al. |
| 2002/0176161 A1 * | 11/2002 | Yoneyama et al. ............ 359/391 |
| 2003/0048931 A1 | 3/2003 | Johnson et al. |
| 2003/0112330 A1 | 6/2003 | Yuri et al. |
| 2003/0124729 A1 | 7/2003 | Christensen et al. |
| 2003/0133009 A1 | 7/2003 | Brown |
| 2003/0142882 A1 | 7/2003 | Beged-Dov et al. |
| 2003/0156276 A1 | 8/2003 | Bowes |
| 2004/0027462 A1 | 2/2004 | Hing |
| 2004/0080758 A1 | 4/2004 | Ban et al. |
| 2004/0141660 A1 | 7/2004 | Barth et al. |
| 2005/0073649 A1 | 4/2005 | Spector |
| 2005/0090017 A1 | 4/2005 | Morales |
| 2005/0094262 A1 | 5/2005 | Spediacci et al. |
| 2005/0112537 A1 | 5/2005 | Wu |
| 2005/0211874 A1 | 9/2005 | Takeyama et al. |
| 2005/0219688 A1 * | 10/2005 | Kawano et al. ............... 359/385 |
| 2005/0221351 A1 | 10/2005 | Jekwam |
| 2005/0239113 A1 | 10/2005 | Ryu et al. |
| 2005/0248837 A1 * | 11/2005 | Sase ...................... G02B 21/32 |
| | | 359/380 |
| 2006/0039583 A1 | 2/2006 | Bickert et al. |
| 2006/0045388 A1 * | 3/2006 | Zeineh ................ G02B 21/365 |
| | | 382/312 |
| 2006/0077536 A1 | 4/2006 | Bromage et al. |
| 2006/0088940 A1 | 4/2006 | Feingold et al. |
| 2006/0098861 A1 | 5/2006 | See et al. |
| 2006/0146283 A1 | 7/2006 | Baumann et al. |
| 2006/0164623 A1 | 7/2006 | Wagner et al. |
| 2006/0171560 A1 | 8/2006 | Manus |
| 2006/0179992 A1 | 8/2006 | Kermani |
| 2007/0025606 A1 | 2/2007 | Gholap et al. |
| 2007/0091324 A1 | 4/2007 | Paul et al. |
| 2007/0098237 A1 * | 5/2007 | Yoo ........................ A61C 1/082 |
| | | 382/128 |
| 2007/0198001 A1 | 8/2007 | Bauch et al. |
| 2007/0207061 A1 | 9/2007 | Yang et al. |
| 2007/0224699 A1 | 9/2007 | Gates |
| 2007/0285768 A1 * | 12/2007 | Kawanabe et al. ........... 359/372 |
| 2008/0002252 A1 * | 1/2008 | Weiss et al. ................... 359/383 |
| 2008/0020128 A1 | 1/2008 | van Ryper et al. |
| 2008/0095424 A1 | 4/2008 | Iki et al. |
| 2008/0095467 A1 | 4/2008 | Olszak et al. |
| 2008/0142708 A1 | 6/2008 | Workman et al. |
| 2008/0180794 A1 | 7/2008 | Tafas et al. |
| 2008/0240613 A1 * | 10/2008 | Dietz et al. .................... 382/284 |
| 2009/0040322 A1 | 2/2009 | Leberl et al. |
| 2009/0116101 A1 | 5/2009 | Tafas et al. |
| 2009/0140169 A1 | 6/2009 | Niehren |
| 2009/0195688 A1 * | 8/2009 | Henderson ........... G02B 21/002 |
| | | 348/345 |
| 2010/0000383 A1 | 1/2010 | Koos et al. |
| 2010/0020157 A1 | 1/2010 | Jelinek et al. |
| 2010/0039507 A1 | 2/2010 | Imade |
| 2010/0074489 A1 | 3/2010 | Bacus et al. |
| 2010/0093022 A1 | 4/2010 | Hayworth et al. |
| 2010/0102571 A1 | 4/2010 | Yang |
| 2010/0109725 A1 | 5/2010 | Yun et al. |
| 2010/0118133 A1 | 5/2010 | Walter et al. |
| 2010/0118393 A1 | 5/2010 | Lin |
| 2010/0134655 A1 | 6/2010 | Kuroiwa |
| 2010/0141751 A1 * | 6/2010 | Uchida ................ G02B 21/365 |
| | | 348/79 |
| 2010/0141752 A1 * | 6/2010 | Yamada ................. G01N 1/312 |
| | | 348/79 |
| 2010/0141753 A1 | 6/2010 | Olson et al. |
| 2010/0171809 A1 | 7/2010 | Fujiyoshi |
| 2010/0177166 A1 | 7/2010 | Eichhorn et al. |
| 2010/0188738 A1 | 7/2010 | Epple et al. |
| 2010/0194873 A1 | 8/2010 | Viereck et al. |
| 2010/0201800 A1 | 8/2010 | Yamamoto et al. |
| 2010/0225668 A1 | 9/2010 | Tatke et al. |
| 2010/0260407 A1 | 10/2010 | Eichhorn et al. |
| 2010/0279342 A1 | 11/2010 | Kijima et al. |
| 2010/0295932 A1 | 11/2010 | Yokomachi et al. |
| 2010/0310139 A1 * | 12/2010 | Kimura ................ G02B 21/002 |
| | | 382/128 |
| 2011/0037847 A1 | 2/2011 | Soenksen |
| 2011/0038523 A1 | 2/2011 | Boardman |
| 2011/0043663 A1 | 2/2011 | Tsuchiya |
| 2011/0064296 A1 | 3/2011 | Dixon |
| 2011/0074817 A1 | 3/2011 | Shinichi et al. |
| 2011/0102571 A1 | 5/2011 | Yoneyama |
| 2011/0109735 A1 | 5/2011 | Otsuka |
| 2011/0145755 A1 | 6/2011 | Bacus et al. |
| 2011/0181622 A1 | 7/2011 | Bacus et al. |
| 2011/0221881 A1 | 9/2011 | Shirota et al. |
| 2011/0316993 A1 | 12/2011 | Chen et al. |
| 2011/0316999 A1 | 12/2011 | Yoneyama et al. |
| 2012/0002043 A1 | 1/2012 | Nitta |
| 2012/0002892 A1 | 1/2012 | Eichhorn et al. |
| 2012/0069171 A1 | 3/2012 | Kodaira et al. |
| 2012/0069344 A1 | 3/2012 | Liu |
| 2012/0076391 A1 | 3/2012 | Dietz et al. |
| 2012/0076411 A1 | 3/2012 | Dietz et al. |
| 2012/0076436 A1 | 3/2012 | Dietz et al. |
| 2012/0081536 A1 | 4/2012 | Kuppig et al. |
| 2012/0114204 A1 | 5/2012 | Olson et al. |
| 2012/0120225 A1 | 5/2012 | Maddison |
| 2012/0127297 A1 | 5/2012 | Baxi et al. |
| 2012/0163680 A1 | 6/2012 | Lefebvre |
| 2012/0208184 A1 | 8/2012 | Ragan |
| 2012/0281931 A1 | 11/2012 | Eichhorn et al. |
| 2013/0003172 A1 | 1/2013 | Widzgowski et al. |
| 2013/0076886 A1 | 3/2013 | Ikeno et al. |
| 2013/0140459 A1 | 6/2013 | Galloway |
| 2013/0162802 A1 | 6/2013 | Soenksen |

(56) References Cited

U.S. PATENT DOCUMENTS

| | | | |
|---|---|---|---|
| 2013/0164781 | A1 | 6/2013 | Lefebvre |
| 2013/0182922 | A1 | 7/2013 | Kil |
| 2013/0216451 | A1 | 8/2013 | Hayworth et al. |
| 2013/0250090 | A1 | 9/2013 | Morimoto |
| 2014/0030757 | A1 | 1/2014 | Schiffenbauer |
| 2014/0049632 | A1 | 2/2014 | Hemmer |
| 2014/0051158 | A1 | 2/2014 | Nakajima et al. |
| 2014/0085453 | A1 | 3/2014 | Yamane |
| 2014/0086463 | A1 | 3/2014 | Meetz et al. |
| 2014/0087411 | A1 | 3/2014 | Chow et al. |
| 2014/0098376 | A1 | 4/2014 | Hashimshony et al. |
| 2014/0112560 | A1 | 4/2014 | Soenksen |
| 2014/0118528 | A1 | 5/2014 | Wolff et al. |
| 2014/0130613 | A1 | 5/2014 | Adiga et al. |
| 2014/0137715 | A1 | 5/2014 | Sneyders et al. |
| 2014/0273086 | A1 | 9/2014 | Lefebvre |
| 2015/0177504 | A1 | 6/2015 | Bickert et al. |

FOREIGN PATENT DOCUMENTS

| | | |
|---|---|---|
| CN | 102841079 | 12/2012 |
| DE | 102009012293 | 3/2009 |
| EP | 1447699 | 8/2004 |
| EP | 2051051 | 4/2009 |
| EP | 2110696 | 10/2009 |
| EP | 2169379 | 3/2010 |
| FR | 2620537 | 3/1989 |
| JP | 59071018 | 4/1984 |
| JP | 61248168 | 11/1986 |
| JP | S63206793 | 8/1988 |
| JP | 09080138 | 3/1997 |
| JP | 09133856 | 5/1997 |
| JP | 9161068 | 6/1997 |
| JP | 09218354 | 8/1997 |
| JP | 2001281553 | 10/2001 |
| JP | 2002031513 | 1/2002 |
| JP | 200284554 | 3/2002 |
| JP | 2006003543 | 1/2006 |
| JP | 2006343595 | 12/2006 |
| JP | 2009192824 | 2/2008 |
| JP | 2008262100 | 10/2008 |
| JP | 2009036969 | 2/2009 |
| WO | WO-0154052 | 7/2001 |
| WO | WO-2005015120 | 2/2005 |
| WO | WO-2008118886 | 10/2008 |
| WO | WO-2008141009 | 11/2008 |
| WO | WO-2010105015 | 9/2010 |
| WO | WO-2012/024627 | 2/2012 |

OTHER PUBLICATIONS

Sakura Finetek U.S.A., Inc., et al., Canadian Examiner's Report dated Dec. 7, 2012 for CA 2,755,164.
Sakura Finetek U.S.A., Inc., et al., International Preliminary Report on Patentability dated Mar. 7, 2013 for PCT/US2011/048488.
Haruhisa, S., et al., "Application of telepathology for improvement of therapeutic effects and economic efficiency, and development of new equipment for it", Science Links Japan; http://sciencelinks.jp/j-east/article/200516/000020051605A0431066.php, Journal Code: N20051113, (2005), 166-125.
Sakura Finetek, PCT Search Report and Written Opinion dated Oct. 13, 2011 for Int'l Application No. PCT/US2011/048488., 13 pages.
Sensovation AG, PCT International Preliminary Report on Patentability dated Sep. 20, 2011 for Int'l Application No. PCT/IB2010/000518., 7 pages.
Sakura Finetek, EPO Office Action dated Jul. 30, 2013 for EPO App No. 10719379.9, 8 pages.
Sakura Finetek, Australian Office Action dated Nov. 26, 2013 for Australian App No. 2010222633, 3 pages.
Sakura Finetek, Japanese Office Action dated Dec. 10, 2013 for JP App No. P2011-553548, 9 pages.
Sakura Finetek, Australian Examination Report dated Dec. 24, 2013 for AU 2011291517, 3 pages.
Sakura Finetek U.S.A., Inc., Final office action dated Sep. 2, 2014 for Japanese App No. 2011-553548.
Sakura Finetek U.S.A., Inc., Examination Report dated Jun. 19, 2014 for Australian App No. 2011291517.
Sakura Finetek U.S.A., Inc., PCT Search Report and Written Opinion dated Sep. 22, 2014 for International Application No. PCT/US2014/034477, 12 pages.
Sakura Finetek U.S.A., Inc., Chinese Final Office Action dated Jul. 3, 2014 for CN Application No. 201080017649.4.
Sakura Finetek U.S.A., Inc., Second office action dated Jul. 6, 2015 for Chinese Appln. No. 201180047558.
Sakura Finetek USA, Extended Search Report for EP15154503 dated Jun. 19, 2015.
Sakura Finetek U.S.A., Inc., Extended European Search Report, EP App No. 15194968.2 (dated Mar. 18, 2016).
Sakura Finetek U.S.A., Inc., Notice of rejection for Japanese Application No. 2013-525005, (dated Feb. 9, 2016).
Sakura Finetek U.S.A., Inc., Final office action, U.S. Appl. No. 13/255,827, (dated Oct. 20, 2015).
Sakura Finetek U.S.A., Inc., "Third Office Action", TW Application No. 201180047558X, (dated Apr. 1, 2016).
Sakura Finetek U.S.A., Inc., "Non final office action", U.S. Appl. No. 14/138,740, (dated Jul. 1, 2016).
Sakura Finetek U.S.A., Inc., "Final Office Action", U.S. Appl. No. 14/779,550 (dated May 24, 2017).
Sakura Finetek U.S.A., Inc., "Final Office Action", JP Application No. 2016-507909 (dated Apr. 28, 2017).
Sakura Finetek U.S.A., Inc., "Final Office Action", U.S. Appl. No. 14/138,740, (dated Jan. 26, 2017).
Sakura Finetek U.S.A., Inc., "First Office Action", EP Application No. 15194968.2, (dated Mar. 10, 2017).
Sakura Finetek USA Inc., "Office Action", EP Application No. 15154503.5, (dated Feb. 28, 2017).
Sakura Finetek U.S.A., Inc., "Final Rejection", JP Application No. P2013-525005, (dated Dec. 27, 2016).
Sakura Finetek U.S.A., Inc., "Fourth Office Action", CN Application No. 201180047558X, (dated Oct. 24, 2016).
Sakura Finetek USA, Inc., "Office Action", JP Application No. 2016-507909, (dated Sep. 15, 2016).
Sakura Finetek U.S.A., Inc., "Examiner's Report", CA Application No. 2808105, dated Jun. 12, 2017.
Sakura Finetek U.S.A., Inc., "Examiner's Report", CA Application No. 2908058, dated Jul. 24, 2017.
Sakura Finetek U.S.A., Inc., "Final Office Action", U.S. Appl. No. 14/138,740, dated Jun. 20, 2017.
Sakura Finetek U.S.A., Inc., "Second Office Action", CN Application No. 2014800218372, dated Aug. 1, 2017.
Sakura Finetek U.S.A., "Extended Search Report", European Application No. 14198636, (dated Sep. 30, 2015).
Sakura Finetek U.S.A., Inc., "EP Supplementary Search Report", EP Application No. 14784707.3, (dated Oct. 4, 2016).
Sakura Finetek U.S.A., Inc., "Examination Report", CA Application No. 2908058, (dated Nov. 16, 2016).
Sakura Finetek U.S.A., Inc., "First Office Action with search report", CN Application No. 2014800218372, (dated Nov. 30, 2016).
Sakura Finetek U.S.A., Inc., "International Preliminary Report on Patentability", International Application No. PCT/US2014/034477, (dated Oct. 29, 2015).
Sakura Finetek U.S.A., Inc., "International Search Report and Written Opinion", International Application No. PCT/US2014/034477, (dated Sep. 22, 2014).
Sakura Finetek U.S.A., Inc., "Non-Final Office Action", U.S. Appl. No. 14/779,550, (dated Jan. 19, 2017).
Sakura Finetek U.S.A., Inc., "Patent Examination Report No. 1", AU Application No. 201453889, (dated May 18, 2016).
Chinese Third Office Action dated Apr. 8, 2018. CN Application No. 201480021837.2.
Sakura Finetek U.S.A., Inc., Chinese First Office Action dated Feb. 9, 2018, CN Application No. 201410415253.5.
Sakura Finetek U.S.A., Inc., European First Office Action dated Mar. 5, 2018, EP Application No. 14784707.3.

(56) References Cited

OTHER PUBLICATIONS

Sakura Finetek U.S.A., Inc., European Office Action dated Feb. 22, 2018.
EP Application No. 15154503.5.
Sakura Finetek U.S.A., Inc., Extended European Search Report dated Apr. 24, 2018, EP Application No. 17202516.
Sakura Finetek U.S.A., Inc., Non-Final Office Action dated Dec. 22, 2017, U.S. Appl. No. 14/779,550.
Sakura Finetek U.S.A., Inc., Notice of Allowance dated Feb. 13, 2018, U.S. Appl. No. 14/138,740.

* cited by examiner

DIGITAL MICROSCOPE AND METHOD OF SENSING AN IMAGE OF A TISSUE SAMPLE

CROSS-REFERENCE TO RELATED APPLICATION

The application is Non-Provisional Application and claims the benefit of the earlier filing date of U.S. Provisional Patent Application No. 61/375,703, filed Aug. 20, 2010 and incorporated herein by reference.

FIELD

Digital microscope.

BACKGROUND

In various settings, examination of biological specimens is required for diagnostic purposes. Generally speaking, pathologists and other diagnosticians collect and study samples from patients, utilize microscopic examination, and other devices to assess the samples at cellular levels. Numerous steps typically are involved in pathology and other diagnostic processes, including the collection of biological samples such as blood and tissue, processing the samples, preparation of microscope slides, staining, examination, re-testing or re-staining, collecting additional samples, re-examination of samples, and ultimately the offering of diagnostic findings.

The examination of a biological sample generally involves magnification of the sample or region of interest of the sample and an assessment by a pathologist or diagnostician. Traditionally, this is done by placing a slide containing a sample on a microscope and examining a magnified view of the tissue sample or region of interest of the tissue sample through a microscope. Recently, digital microscopes have been developed wherein a sample, particularly a sample on a microscope slide is placed in an instrument and a magnified digital image of the sample or region of interest of the sample is captured and displayed on a monitor such as thin film liquid crystal display monitor. While being able to view a sample or origin of interest of a sample on a display rather than through a lens of a microscope may be beneficial to the pathologist or other diagnosticians, often the time it takes to scan a magnified image and display that image presents an inconvenient delay or a significant delay when multiple samples need to be processed (magnified).

DETAILED DESCRIPTION

Figure 1:
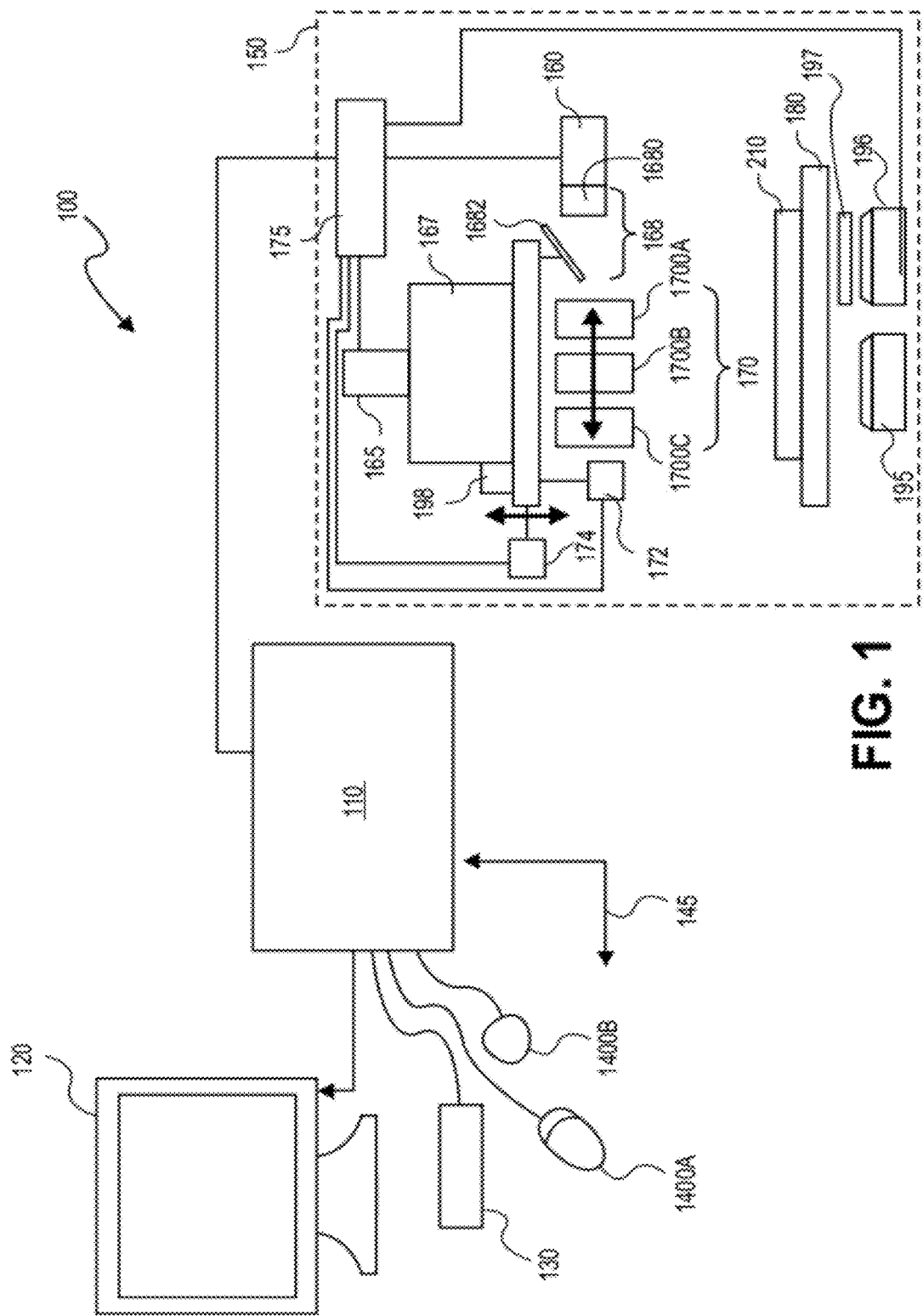
FIG. 1 is a block diagram of a system including a digital microscope for examining a sample.

FIG. 1 shows a block diagram of a system for examining a sample such as a tissue sample. Referring to FIG. 1, system 100 includes computer 110. Computer 110 includes, for example, a central processing unit that in one embodiment is an Intel Core 2 Quad or better having at least 4 gigabytes of random access memory and at least one terabyte hard drive memory. Computer 110 also includes a DVD writer and an operating system such as Windows 7.

Connected to computer 110 is display 120 configured to display information transmitted from computer 110. Display 120 is, for example, a thin film liquid crystal display monitor that is S-IPS or PVA technology based. A 24-inch or greater color monitor is a representative example. Alternatively, two, three or more displays can be connected to computer 110 to provide a user with more information in a more structured way. For example, one display may provide the image of a sample having a hematoxylin and eosin (H&E) stain, while another one shows images of the same case using a different type of staining method, and a third may show clinical data from other disciplines such as Clinical Chemistry, Hematology, Radiology. Also connected to computer 110 is keyboard 130, mouse 1400A and mouse 1400B. In one embodiment, mouse 1400A is a two-dimensional conventional mouse and mouse 1400B is a three-dimensional mouse such as the 3DConnexion Space Navigator™. Three-dimensional mouse 1400B may, for example, be used to position or navigate the environment and mouse 1400A may, for example, be used to select, create or edit.

Computer 110 may have internet and/or internet connection 145 to allow remote transmission operation of system 100 and/or to connect to a network operating system.

Connected to computer 110 in this embodiment of system 100 is digital microscope 150. Digital microscope 150 may include one or several imaging systems including sensor 160 and sensor 165, optical imaging sub-system 168 and optical imaging sub-system 170, autofocus optics and illuminations. Each imaging system may have a different optical resolution or range of resolution. At least one optical system may reach magnification, m≤1. The system may also provide high resolution with magnifications, m>1. The digital microscope also includes stage 180 translatable in x-, y- and z-directions and control electronics.

Digital microscope 150 may be operated as a bright field and/or fluorescence microscope. In the case of a bright field operation, a sensor or sensors sense(s) the absorption of the sample and captures an image of the sample on the stage 180 with a light source on the opposite side of sensor(s) with respect to the sample. As shown in FIG. 1, light source 195 and light source 196, each, for example, a light emitting diode (LED) light source, are positioned below stage 180. An opening in stage 180 allows light to be emitted through stage 180 to illuminate a sample, such as a slide on stage 180. In the case of a fluorescence microscope operation, the imaging system images fluorescence markers which have been excited by a fluorescence illumination light source. The fluorescence light is typically coupled into the optical system via a dichroic mirror between the infinity corrected microscope objective and a tube lens. In such case, both the sensor and the illumination light source are on the same side of the sample. Referring to optical imaging sub-system 168 and sensor 160, in one embodiment, sensor 160 comprises a commercially available digital camera with an area sensor, for example, a charge-coupled device (CCD). CCD sensors are subdivided in several million photo-sensitive square units (pixels) which describe the resolution of the sensor. A typical pixel size (sensor resolution) of such a sensor is about 5 microns (μm)×5 microns. The size which a pixel represents using the magnification of the optical system on the sample is commonly referred to as the pixel resolution. Using an optical system with a magnification $0.1 < m < 40$, results in a pixel resolution of approximately 50 microns to 125 nanometers.

In one embodiment of an imaging system, sensor 160 is configured to sense and capture an image of a sample, such as an image of a slide or a portion of a slide on stage 180. Optical imaging sub-system 168 in digital microscope 150 includes lens or objective 1680 that focuses light from light source 195 of an illumination sub-system on sensor 60. Light from light source 195 is emitted through an opening in stage 180, through a slide on stage 180. Mirror 1682 of optical imaging sub-system 168 directs the light to lens or objective 1680. Sensor 160 may capture such image by sensing the image, without magnification (m=1) or a magnification less than one (m<1) through optical imaging sub-system 168. In one embodiment, a location of optical imaging sub-system 168 and sensor are fixed. Mirror 1682 may be moved in an x- and a y-direction by xy-stepper motor 172 and in a z-direction by z-stepper motor 174.

Computer 110 receives signals representative of a sensed image from sensor 160 and generates an image for display and displays such generated image on display 120.

In one embodiment, sensor 165 is similar to sensor 160. Sensor 165 is configured to capture an image of a sample, such as an image of a slide or a portion of a slide on stage 180. Sensor 165 captures such image through optical imaging system 170 (m>1). Optical imaging sub-system 170 in digital microscope 150 may include multiple objectives. Objective 1700A, objective 1700B, and objective 1700C are shown. Objective 1700A is, for example, an infinity corrected type from Carl Zeiss having a magnification of 2.5×. Objective 1700B is, for example, an infinity corrected type from Carl Zeiss, having a 20 times (20×) magnification. Objective 1700C is, for example, a Carl Zeiss A-plan objective, having a 40 times (40×) magnification. Interchanging these objectives yield different optical systems, where each system results in a different pixel resolution (e.g., two microns for magnification 2.5 and 250 nanometers for magnification 20). As needed, other objectives can be substituted or more objectives can be added. The individual objectives are movable in an x- and a y-direction by xy-stepper motor 172 allowing a particular objective to be associated with sensor 165 and a slide on stage 180 when desired. Representatively, the objectives and mirror 1682 may individually be connected to a track and are motorized to move along the track and actuated into position when desired.

Disposed between sensor 165 and optical imaging sub-system 170, in one embodiment, may be automatic focusing system 167 including a beam splitter, an autofocus detector and autofocus illumination. An infrared filter and tube lens may also be disposed between sensor 165 and optical imaging sub-system 170, such as between automatic focusing system 167 and sensor 165.

In one embodiment, when capturing images through optical imaging sub-system 170, microscope 150 uses light source 196 of illumination sub-system positioned beneath stage 180. Light source 196 may be similar to light source 195. Associated with light source 196 (i.e., disposed between light source 196 and stage 180) and included in the illumination sub-system are motorized apertures or diaphragms 197 providing Köhler illumination that improves the specimen illumination.

Computer 110 receives signals representative of a sensed image from sensor 165 and generates an image for display. The generated image is displayed on display 120.

In the above-described embodiment, multiple sensors (sensor 160, sensor 165) are described to capture an image of a sample on a slide. In another embodiment of an imaging system, system 100 includes a single sensor configured to capture an image of a slide or a portion of a slide without magnification (m=1) or with a magnification less than one (m<1) and to capture an image or portion of an image through magnifying optical imaging sub-system 170 (m>1). In this embodiment, a single sensor may be utilized in connection with interchangeable optics (e.g., optical imaging sub-systems 168 and 170). Similarly, in the above embodiment, instead of light source 195 for optical imaging system 168 and light source 196 for optical imaging system 170, a single light source may be used for each imaging system.

In one embodiment, digital microscope 150 includes control unit 175. Control unit 175 is connected to computer 110. Control unit 175 is connected to computer 110. Control unit 175 is also connected to the various components of digital microscope 150 to control an operation of digital microscope based on signals received from computer 110. Control unit representatively controls xy-stepper motor, z-stepper motor, light source 185, light source 196, motorized apertures or diaphragms 187, optical imaging sub-system 168, optical imaging sub-system 170, sensor 160 and sensor 165.

Referring to digital microscope 150 operated as a bright field microscope, in one embodiment, where a tissue sample is a slide having a label with patient identification information and/or other information, including, for example, type of stain or process to which the sample was subjected, printed on the label, digital microscope 150 can sense and capture such information. Using a light source beneath a label to illuminate the label, however, may not make the label information visible. Accordingly, in one embodiment, second light source 198 is utilized to illuminate the slide or a label portion of the slide so that the data on a slide label may be sensed via reflectance. An image of the label may be captured with, for example, sensor 160 and optical imaging sub-system 168.

Referring again to FIG. 1, stage 180 is manipulated in three directions by control unit 175: x-direction (side to side as viewed), z-direction (up and down as viewed) and y-direction (into and out of page as viewed). The z-direction may also be accomplished by moving the optics with respect to the sample. Stage 180 is manipulated in an x-direction and a y-direction by xy-stepper motor 172 and in a z-direction by z-stepper motor controlled by control unit 175.

Referring again to digital microscope 150 of system 100, the microscope includes stage 180. In one embodiment, stage 180 is sized to handle one or more slides. In one embodiment, a slide tray including four slides may be contained on stage 180. FIG. 1 shows slide carrier 210. In another embodiment, a slide loader can be attached to system 100, which allows for the automatic loading and unloading of up to about 240 slides. The slide loader allows system 100 to perform slide imaging automatically, whether a user is present or not in a reflex imaging mode. Users can select to either use the automatic slide loader or the slide tray.

Figure 2:
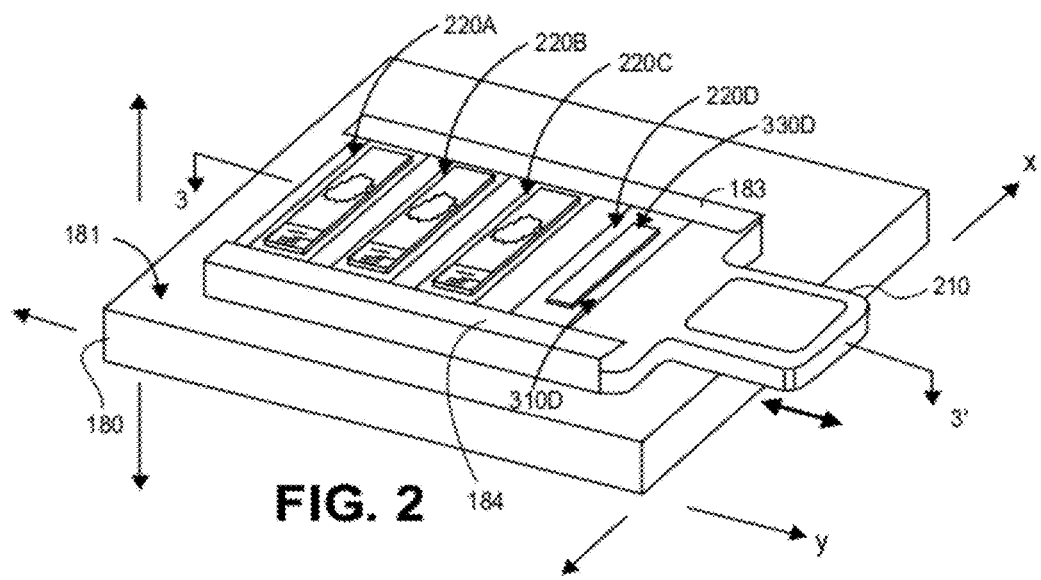
FIG. 2 is a top perspective view of an embodiment of a slide carrier for use in a digital microscope system.

FIG. 2 shows a representative example of slide carrier 210 on stage 180 within microscope 150. Slide carrier 210 is, for example, a molded polymer material that includes four slide cavities 220A, 220B, 220C and 220D each for retaining an individual slide (e.g., a 25 millimeter×76 millimeter slide). Three slide cavities (cavity 220A, 220B and 200C), in the illustration of FIG. 2, contain a slide while fourth cavity (cavity 220D) is empty. Slides may be placed in respective slide cavities by a user or automatically by, for example, a mechanism associated with a slide loader (e.g., a pick and place robotic instrument). In one embodiment, a slide is not mechanically restrained by slide carrier 210 but instead rest partially within a slide cavity.

Figure 3:
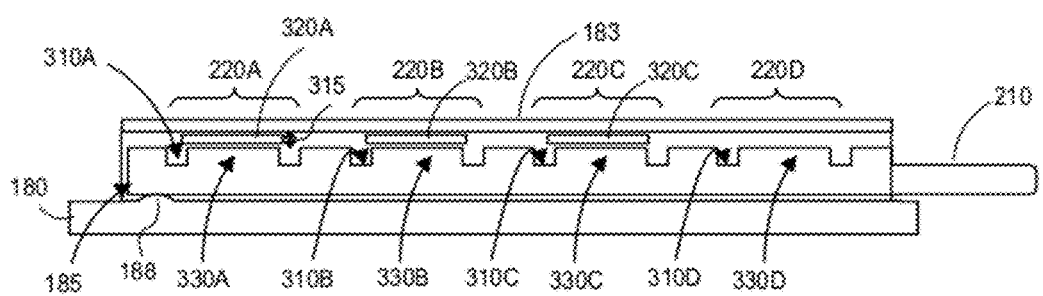
FIG. 3 is a cross-sectional side view through line 3-3' of FIG. 2.

FIG. 3 shows a side view of slide carrier 210 on stage 180 through line 3-3' of FIG. 2. In this embodiment, slides 320A, 320B and 320C are shown in slide cavities 220A, 220B and 220C, respectively. No slide is shown in slide cavity 220D. Each slide cavity includes a cavity (cut out) portion and a plateau portion (330A, 330B, 330C and 330D). A slide rests horizontally on a plateau portion. Each plateau portion has a height dimension such that when a slide rests on an upper surface of the plateau portion (as viewed), a portion of a thickness of the slide extends a distance 315 above a height dimension of slide carrier 210 (as viewed).

Referring to FIG. 2 and FIG. 3, slide carrier 210 may be seen to be within a pocket or holder of stage 180. Stage 180, in one embodiment, is a molded plastic piece having a size to support slide carrier 210 within digital microscope 150. The pocket or holder of stage 180 is formed by opposing L-shaped brackets protruding from surface 181 (a top surface as viewed) of stage 180. FIG. 2 shows bracket 183 and bracket 184, each having an inverted L shape and opposing one another (with a base of the inverted L or cantilevered portion facing toward the opposing bracket). Bracket 183 and bracket 184 are separated by a distance at least greater than a width dimension of slide holder 210. (For example, if slide holder 210 has a width dimension on the order of 10 centimeters (cm) to 12 cm, bracket 183 and bracket 184 are separated by that distance plus 0.25 cm-0.5 cm greater.) Each bracket extends a height dimension from surface 181 that is greater than a thickness of slide holder plus a distance 315 to which a slide in a slide cavity of slide holder 210 protrudes beyond surface 181 of slide holder 210. For example, if slide holder has a thickness on the order of 1 cm, a base of the cantilevered or inverted L portion of each of bracket 183 and bracket 184 is at a distance from surface 181 of stage 180 of 1 cm plus more than a distance 315. For example, if distance 315 is 1 mm, the cantilevered portion of each of bracket 183 and bracket 184 is at a distance from surface 181 of stage 180 of 1.2 cm or more. An orientation and configuration of bracket 183 and bracket 184 of stage 180 allow slide holder 210 to be guided in and out of the pocket formed by the brackets.

Referring to FIG. 3, in one embodiment, stage 180 includes hump 188 on surface 181 at a distal end of the pocket formed by bracket 183 and bracket 184 (distal from a point where slide holder 210 enters the pocket). Hump 188 has a dimension sufficient to elevate stage holder 210 from surface 181 of stage 180 and bring any slides in slide cavities of slide holder 210 into contact with cantilevered portions of bracket 183 and bracket 184. In this manner, cantilevered portions of bracket 183 and bracket 184 act to secure or support a position of a slide when slide holder 210 is on stage 180. Representatively, hump has a thickness or height dimension on the order of a few millimeters and a length dimension of 0.5 cm, and a width that extends between bracket 183 and bracket 184. Alternatively, two or more smaller width dimensioned bumps may be used.

In operation, digital microscope 150 uses one of sensors 160 and 165 to sense and capture images of a sample or a region of interest of a sample on the slide. The sensor captures slide images of the sample and transmits those images in digital signals to computer 110 and such signals are displayed on display 120. In one embodiment, when capturing an image and displaying that image on display 120, it may not be desirable to store the image in the sense that it could be retrieved in the future. Instead, the image is transmitted from sensor 160 or sensor 165 to computer 110 and absent some instruction from a user or from the system to take another action, the images are refreshed representatively at a refresh rate on the order of several images per second. The refreshing rate may vary. If there is no action of the microscope, for example, there is no need to refresh the image.

In one embodiment, sensor 160 captures an image of a sample on a slide with a magnification of one or less ($m \leq 1$). In other words, where a magnification is less than one ($m<1$), optical imaging sub-system 168 project an unmagnified or a demagnified image of the sample on the sensor. Representatively, sensor 160 is smaller than a slide (e.g., a sensor is approximately 3 to 4 millimeters in diameter while a slide is approximately 25 millimeters by 76 millimeters). Optical imaging sub-system 168 includes an objective that projects a larger field of view on sensor 160.

In one embodiment, system 100 creates an overview image of an entire sample on a slide or a portion of an entire sample. The overview image is an image captured without magnification as described above (i.e., a magnification of one or less than one). An advantage to capturing a overview image is the speed at which it can be captured. For example, an image of a full slide can be captured on the order of one to two seconds while capturing a magnified image may take on the order of 20 seconds or more.

As noted above, a sensor is smaller than a slide and typically smaller than a sample or a portion of a sample on the slide. In order to obtain an acceptable resolution of an image, such as an overview image, an area that individual pixels of the sensor represent is reduced. In one embodiment, to obtain an acceptable overview image of a sample on the slide, sensor 160 will take multiple images and stitch those images together. For example, in one embodiment, a slide or an image sample such as an entire sample on a slide is divided into thirds with a sensor capturing light through a third of the desired area for the overview image (e.g., a third of the usable area of a slide). To coordinate the capture of light representative of a third of a sample, stage 180, in one embodiment, is moved to a desired portion within the field of view of sensor 160.

Referring to FIG. 2, stage 180 is translatable in an x- and y-direction. Sensor 160 remains stationary. In one embodiment, stage 180 is translated in response to signals from control unit 175 to xy-stepper motor 172.

In one embodiment, microscope 150 and system 100 is calibrated using a reference slide carrier such that a nominal position of slides are known within a defined tolerance. The defined tolerance is a result of the xz coordinate system of stage 180 (±p); the mechanical tolerances of slide carrier 210 and its position when inserted into microscope 150 (±q); and the mechanical tolerances of slide cavities in slide carrier 210 that accept slides (±r). The defined tolerance considering these factors is p+q+r. An overview image of a slide, in one embodiment, consists of three overlapping images with the field of view of each image and overlap selected to accommodate the defined tolerance and to collectively capture an image of the entire slide. In other words, since the images obtained by sensor 160 will be stitched, in one embodiment, stage 180 is translated from one field of view of sensor 160 to a different field of view such that, at the different field of view, there is an overlap of another field of view (e.g., a previously imaged field of view). In one embodiment, the overlap is at least 20 pixels more than a maximum tolerance of the stage, slide carrier and cavities within the slide carrier (e.g., 20 to 50 pixels).

Figure 4:
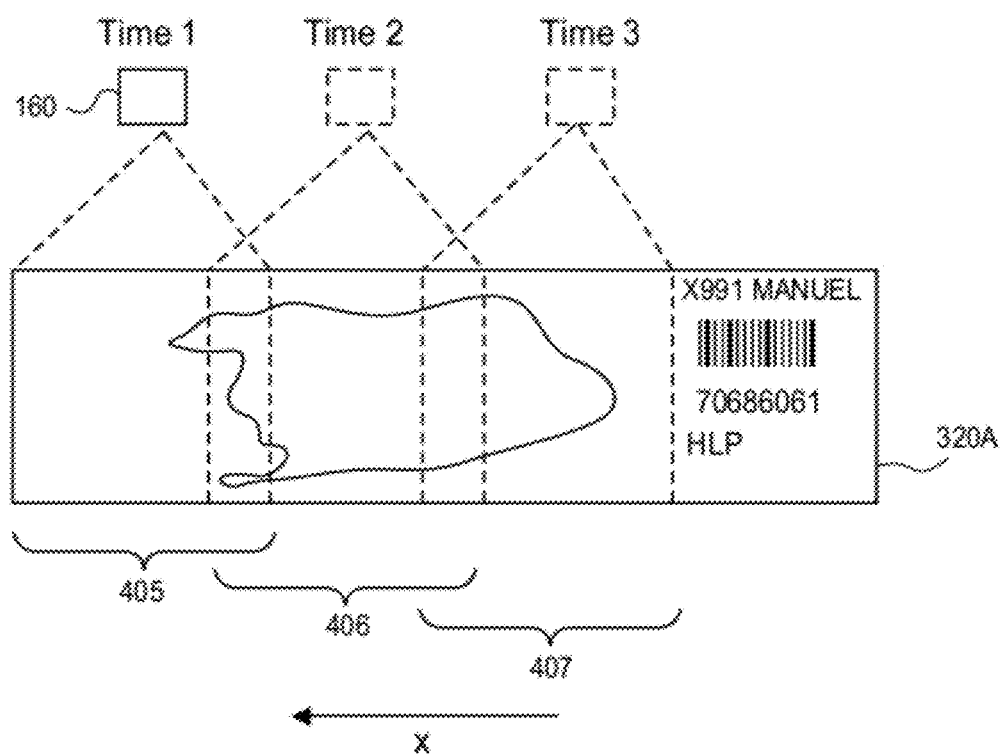
FIG. 4 shows a top view of an embodiment of a slide having a sample and a label thereon and indicating a field of view of a sensor of an embodiment of a digital microscope.

FIG. 4 demonstrates an image capture of an image or a portion of an image. Referring to FIG. 4, stage 180 is positioned so that slide 220A is within the field of view of sensor 160. Slide 220A is positioned so that a first image captured by sensor 160 will be at one edge of a slide. For example, assuming a slide is approximately 76 millimeters long with a slide label occupying approximately 16 millimeters of that length at one end, the remaining approximately 60 millimeters of the slide will constitute the usable area of the slide (i.e., an area where a sample could be located). Sensor 160 will be positioned at an opposite end such that it captures the first 20 to 25 millimeters length of the slide from that end. An edge of a slide or an edge of a slide label on a slide may provide an x-coordinate and a y-coordinate. Stage 180 can use these coordinates to establish a position to capture the first 20 to 25 millimeters of the slide from the slide label. In stitching images together, the first image may be considered a fixed reference to which other images are stitched to form the overview image. At a first portion of an image, FIG. 4 shows sensor 160 capturing a portion of slide 220A designated in area 310 as a first or Time1 image. Stage 180 then moves in an x-direction approximately 20 millimeters and sensor 160 captures a second image at Time2 represented by area 320. Finally, stage 180 moves to a third position in area 330 within the field of view of sensor 160 and sensor captures an image of area 330 at Time3.

Figure 5:
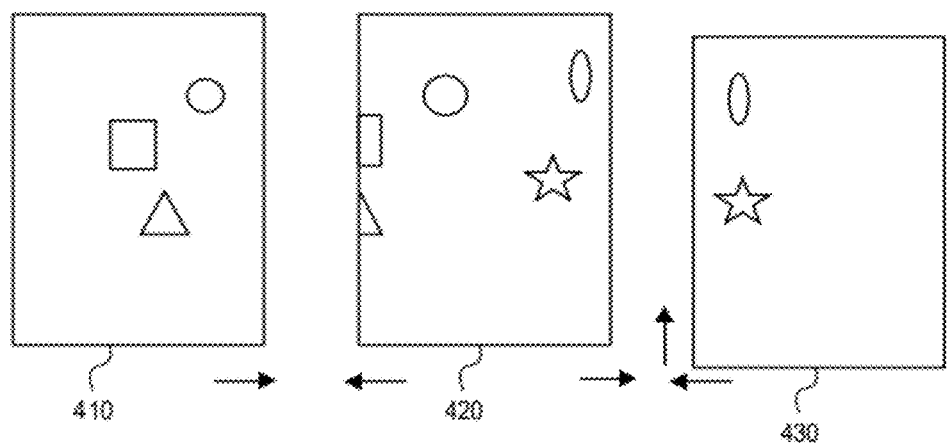
FIG. 5 shows a representation of three adjacent images of a sample each captured by a sensor of a digital microscope.

In the description of image capture of adjacent images, in one embodiment, the system requires overlap of the captured images. Overlap is shown in FIG. 5 where area 420 overlaps a portion of area 410 and area 430 overlaps a portion of area 420. The overlap is put to beneficial use when the images are stitched together. In one embodiment, the system strives for approximately 20 to 50 pixels overlap between adjacent images. Following the capture of adjacent images, the adjacent images are assembled or stitched together.

Figure 6:
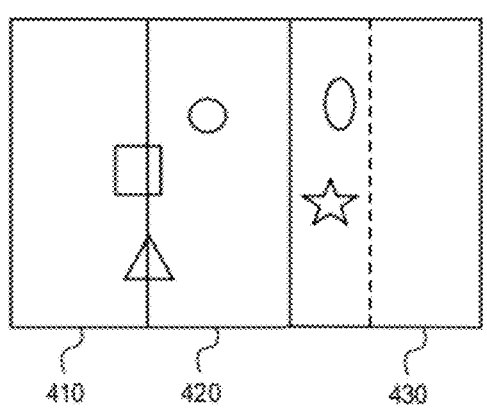
FIG. 6 shows the three adjacent images of FIG. 5 following their stitching together.

FIGS. 5 and 6 illustrate an embodiment of stitching. In one embodiment, the system uses landmarks of the sample and seeks to align common landmarks to form an overall image. FIGS. 5 and 6 show simple geometric landmarks or features to represent this concept. FIG. 5 shows image represented by area 410 and image represented by area 420 are put together using the geometric symbols as landmarks or features common to adjacent areas. In this example, the image represented by area 410 and the image represented by area 420 need to be moved along a single axis for alignment. System 100, however, also allows more alignment possibilities, such as along two axes and rotation. For example, the image represented by area 430 is shown offset in the y-direction relative to the image represented by area 420. Thus, the image represented by area 480 may be moved in two directions (x-direction, y-direction) to align identified common landmarks or features between the images.

As noted above, in one embodiment, the stitching of portions of an image to gather the overview image is performed as the images are captured. Although FIG. 5 shows three separate images, in one embodiment, in the example with the respect to, the image represented by area 410 and the image represented by area 420 are stitched together immediately upon capturing of each image. As the image represented by area 430 is captured, that image is aligned and stitched to the combined image represented by area 410 and area 420. Images of the individual areas are not saved. Instead, once a sufficiently large area of an image of the sample is stitched and assembled, the assembled area is broken into similarly sized fractions and saved in a file structure or may be compressed using a compression format (e.g., JPEG). The saved image area is deleted from random access memory (RAM) of computer 110.

System 100 can establish approximately where a sample is on a slide as well as a location of significant features based on the field of view images used to assemble an overview image. For example, each pixel of an overview image represents a specific area, e.g., 5.4 µm×5.4 µm. Further, the assembled image is represented by the pixel number of sensor 160 which can be described in terms of x- and y-coordinates, e.g., 2504 x-direction pixels by 3324 y-direction pixels. With this information, a selection by mouse 1400A or mouse 1400B of a position in the overview image is a selection of a pixel or pixels in that image. Since a size of each pixel is known, system 100 can determine the number of pixels in an x-direction and a y-direction that a selected position (e.g., a position of a feature of the image) is located relative to a starting position, e.g., an edge of the image. An approximate coordinate system for the image may thus be established such that system 100 can identify a location of an area including a feature represented by a particular pixel or pixels.

Figure 7:
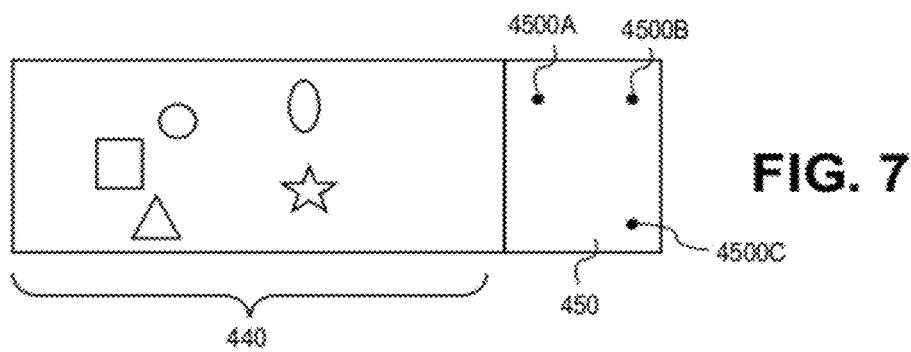
FIG. 7 shows an image of a slide including the three adjacent images of FIG. 5 stitched together and a slide label.

As noted above, generally a slide has a label fixed to a surface. In one embodiment, it is desirous to have an overview image including not only of the sample on the slide but also the slide label. Because a slide label will obstruct light introduced in digital microscope 150 from below the slide, digital microscope 150 includes sensor 198 that captures an image of the slide label in reflectance. FIG. 7 shows label 450 that may be sized and manipulated (e.g., rotated) so that when assembled with the overview image taken from the slide field sensor (sensor 160), label 450 may be adjacent to the image. FIG. 7 shows an overview image 440 of stitched together portions of the image (a portion represented by area 410, a portion represented by area 420 and a portion represented by area 430) to create a full stitched together image of the active portion of the slide. FIG. 7 also shows an image of label 450 adjacent the overview image of the sample. As noted above, individual portions of the sample are not saved, only the composite stitched slide image (e.g., an overview image). In one embodiment, the stitched slide image is saved separate from the label image.

In another embodiment, the stitched slide image is saved with the label image stitched adjacent to it. In either situation, the composite image may be saved with conventional compression software (e.g., JPEG).

Where sensor 160 and optical imaging sub-system 168 are positioned over a sample on a slide to capture an image of that slide, a user of system 100 can electronically "zoom" in to increase the resolution. In one embodiment, system 100 initially captures an overview image of a sample on a slide (e.g., an overview image of the entire sample) with sensor 160 and an image of the slide label. The initial overview image may be stitched together as described above. In one embodiment, the initial image is displayed at a relatively larger sensor to pixel ratio (multiple pixels of sensor 160 mapped to a pixel of display 120). It is appreciated that pixels on display 120 are generally larger than on sensor 160. For example, pixels on sensor 160 have a size on the order of five microns while a pixel size of display 120 are on the order of 0.5 millimeters.

In one example, the initial overview image is displayed at a sensor to display pixel ratio of four to one or greater. A user then uses mouse 1400A to select a region of interest in a sample. The user can then zoom in to increase the image resolution at that particular point or that particular region of interest and/or increase the magnification. Representatively, to zoom in electronically at a selected region of interest (selected by mouse 1400A and located by system 100 as described above), a user directs mouse 1400B to zoom in and, in response, system 100 will modify a sensor to display pixel ratio from, for example, four to one toward one to one or more (i.e., map fewer sensor pixels to individual display pixels). It is appreciated that as the individual sensor pixels are mapped to more display pixels, the image will appear to the user as being magnified as the display area of the region of interest on display 120 increases. A user can accept and save the image at any desired ratio of sensor pixel to display pixel.

At some point, a threshold resolution will be reached (e.g., a one-to-one sensor to display pixel ratio). If the user wishes to continue to zoom in on the region of interest, in response, system 100 will automatically switch from an optical magnification of one or less to the next higher magnification in microscope 150. In an embodiment where a separate sensor is associated with magnifying optics, system 100 will automatically switch to sensor 165 and position magnifying optical imaging sub-system 170 over the region of interest. Representatively, when the threshold resolution of the image is reached with sensor 160 and optical imaging sub-system 168, system 100 will switch to magnifying the image through objective lens 1700A. Objective lens 1700A is, for example, a 2.5× magnification.

Upon switching to capturing an image through magnifying optical imaging sub-system 170, the sensor to display pixel ratio will once again begin at a pixel ratio greater than one to one (e.g., four to one). A user can accept that captured image and save that captured image or continue to zoom in and accept and save the image at any desired ratio. Continuing to zoom in again initially involves modifying a sensor to display pixel ratio from a sensor to display pixel ratio greater than one to one towards a ratio of one to one or more. Once the threshold resolution is reached, system 100 will change objectives from objective 1700A to objective 1700B with the next higher optical magnification. In one embodiment, objective 1700B is a 20× magnification. Continued zooming follows the same action.

The above discussion involved user interaction to direct system 100 to electronically zoom in and/or increase magnifications. In another embodiment, system 100 may do this automatically. For example, system 100 may be configured to perform the above operations to capture saved images at different resolutions and/or magnifications.

In one embodiment, when a slide is placed in digital microscope 150, system 100 immediately creates an overview image with a magnification of one or less than one. A user can zoom in where sensor 160 is capturing an image from a sample in the slide as described above, or a user can alternatively capture a greater magnification of a region of interest on the sample by telling the system to increase magnification. One way a user does this is by using mouse 1400A and selecting a region of interest on the overview image and indicating the desired magnification. In the latter case, it is appreciated that a user may make the selection on an overview image whether or not a particular sample/slide is currently the slide to which sensor 160 may be capturing an image. For example, where sensor 160 is currently capturing an image of slide 320A (see FIG. 3) and a user wants a magnified image of a region of interest of slide 320B, a user will navigate with mouse 1400A to a thumbnail image of slide 320B present, for example, with thumbnail images of other slides along a side of display 120. The thumbnail image may be a smaller presentation of the image or a portion of the image, for example, a representation of a portion of the image using a reduced number of pixels. A user may then select the thumbnail overview image of slide 320B with mouse 1400A (e.g., by clicking on it). System 100 will then display a larger image of the overview image of slide 320B on screen 120 and stage 180 may move slide 320B into position for image capture by sensor 160. If a magnified image is stored in a memory of computer 110, system 100 will retrieve it and display it on display 120. If, however, a magnified image does not exist, system 100 will generate one. It is appreciated that slide 320B must be in slide carrier 210 in digital microscope 150.

Using the example of a user wanting a magnified view of a portion of a sample on slide 320B, initially a saved overview image of slide 320B will be displayed on display 120. If, for example, a user wants a magnified image of a portion of the image (e.g., a region of interest), the user can drag mouse 1400A to a desired position of display 120 showing a sample on slide 320B and then indicate to system 100 the desired area of magnification by clicking on mouse 1400A. As noted before, a specific coordinate system of the overview image may not be saved. However, system 100 knows the approximate location selected by a user, because it knows where on display 120 a user indicated (e.g., clicked), it knows the size of individual pixels in the overview image (e.g., 50 µm×50 µm) and it knows the pixel size of the image (e.g., 3324×2504 pixels). Since the system previously identified slide 320B in slide carrier 210 and the approximate location of the sample on the slide, system 100 will approximately know the region of interest to capture a magnified view of the region of interest. Similarly, if a magnified image including a region of interest had previously been saved, system 100 can retrieve that image based on a user indicating the region of interest on the overview image. In other words, an ability to identify a region of interest by a pixel position in an overview image applies not only to the overview image of a sample but to any other image of that sample.

In one embodiment, system 100 allows a user to put an annotation on an image and save the location of the annotation. For example, a user may wish to identify a region of interest in a 20× image by an arrow (an annotation) pointing at the region of interest. In one embodiment, a user locates the region of interest in 20× magnification, then moves mouse 1400A to the point where an annotation is desired. The user indicates to system 100 that it desires to put an annotation or object at a location (e.g., by previously selecting (clicking on) an icon in the display browser) and clicks mouse 1400A to place the annotation. To place the annotation, system 100 must locate the point in the 20× image. Similar to locating points in an overview image, system 100 can find the point because it knows a pixel resolution at 20×, a pixel size of the sensor (e.g., 5.4 µm×5.4 µm) from which a pixel size may be determined (5.4/20×1000=270 nm), and it knows the pixel number (e.g., 3324 pixels×2504 pixels). Based on this information, system 100 can locate and store information about a location of a point (e.g., a pixel or pixels) in the 20× magnified view as well as in the overview image of the slide.

Where slide information including an annotation or object of a point or region of interest of a slide is saved in system 100 and the slide is removed from digital microscope 150 and slide carrier 210, system 100 can also find the point or region of interest when the slide is reinserted in microscope 150. As described earlier, there are error tolerances associated with stage 180, slide carrier 210 and cavities within slide carrier 210. These error tolerances could effect alignment of an annotation to a particular point or region of interest of a sample on a slide when the slide is removed and then reinserted in slide carrier 210 and microscope 150. To account for this potential alignment error, in one embodiment, system 100 captures a new image of the slide or a portion of the slide and compares the new image to the saved image with the annotation. For example, system 100 may take a new image of the slide label or a corner of the sample and overlay that image on the saved image of the label or the corner of the sample, respectively. If the images are not aligned, system 100 rotates and/or linearly positions the new image until it is aligned. In doing this adjustment, system 100 stores information about the adjustment and uses this stored information to find where an annotation is located in the new view of the image. In a simple example, a new image of a sample on a slide reinserted into slide carrier 210 and microscope 150 is determined to be three pixel lengths in an x-direction different than the original image of the slide including the annotation. When indicating the annotation in the new image, system 100 knows the x-direction position of the annotation in the old image and then moves the annotation three pixels to the right to locate the annotation in the new image.

With regard to saving images (e.g., an overview image, a magnified image), in one embodiment, a single assembled image of a sample is saved. In another embodiment, a hierarchy of images of the sample is saved. In one embodiment, a hierarchy of images of a sample is created based on a sensor to display pixel ratio. In this embodiment, a highest ranked image in the hierarchy is an image having a one-to-one pixel ratio (full resolution sample mapping each sensor pixel with each display pixel). One or more lower ranked images of increasing sensor to display pixel ratio (a sensed image is displayed on display 120 such that one sensor pixel is mapped to more than one display pixel, e.g., 2:1, 4:1, etc.) make up the remainder of the hierarchy of images. Each of the full resolution sample and the one or more lower ranked images may be stored together in a data set.

For objectives with high magnification, a depth of field (i.e., objects within the depth of field (z-direction range)) is relatively small. The z-direction range is so small (e.g., 1 µm) that the image captured may not capture all objects in a sample having a thickness, for example, on the order of 10 µm, in one image capture. To capture as many objects as possible, in one embodiment, system 100 may capture several images at different focal planes by a depth of field. In the example, system 100 may capture 10 images moving stage 180 one micron in a z-direction between each capture. Such an operation will result in 10 image planes representing a z-direction stack or z-stack of the sample.

In another embodiment, a coordinate system for each slide may be established using a label image. In one embodiment, a slide label may be printed with more than one perceivable dot or point. FIG. 7 shows an embodiment of a slide label having three points (point 4500A, point 4500B, point 4500C). Sensor 160 or sensor 165 can perceive these points and, having perceived them, system 100 can determine a pixel location of each point and the number of pixels between each point. By associating image 440 adjacent label 450, system 100 can locate any position on image 440 based on its x- and y-distance from one or more points.

In one embodiment, a data set including a saved image or hierarchy of images of a sample, a z-stack, a coordinate system for that image, if any, and separately saved label image is assembled in a memory of computer 110. Such a data set may also contain comments or annotations (including markings on an image made by a user) and content of label (e.g., interpretation of label).

Having described certain components of system 100, a brief description of operation is now presented. In one embodiment, use of system 100 is software driven. In other words, a machine or computer readable medium is provided in computer 110 containing program instructions that, when executed, will carry out the various methods of operation described.

Figure 8:
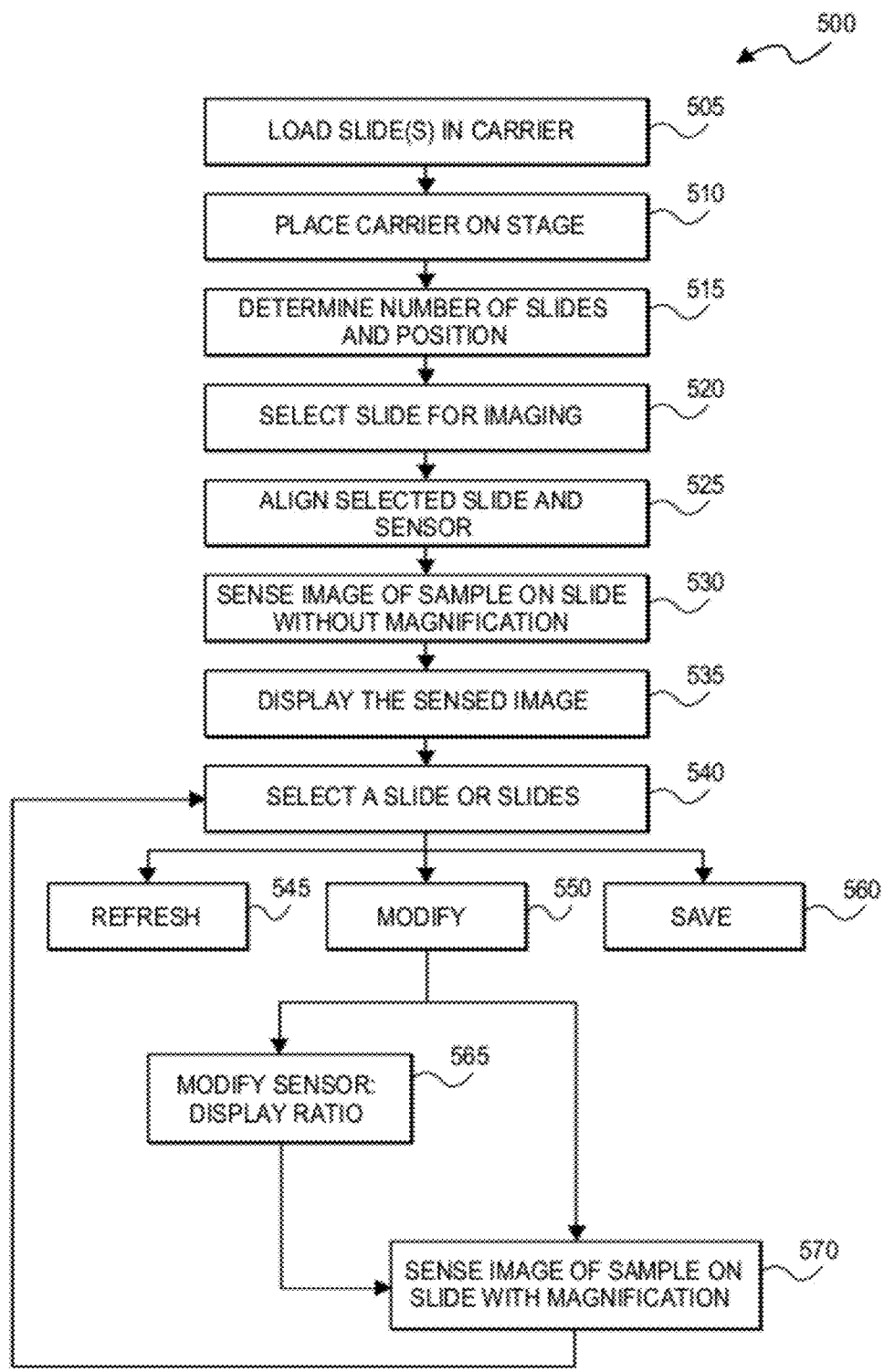
FIG. 8 describes a flow chart of an embodiment of image capture by a system including a digital microscope.

In one embodiment, a method of operation is illustrated in FIG. 8. Method 500 will be described with reference to components of system 100 and various screen shots that, in one embodiment, are displayed on display 120.

As a starting point, slide carrier 210 may be loaded into digital microscope 150 and placed on stage 180. Sensors may be located on stage 180 to sense a slide carrier. Computer 110 is responsive to such sensors. When computer 110 senses slide carrier 210 on stage 180, in one embodiment, system 100 has three modes: a live mode; a scanning mode; and a viewing mode. The live mode and viewing mode are interactive modes in that they include user interaction. The scanning mode may be operated interactively or be fully automated with specific predefined parameters or configurations for scanning (saving) images. For example, in the scanning mode, slide(s) may be loaded onto a slide carrier and inserted into a digital microscope and the system will sense and save one or more images of samples on a slide.

Figure 9:
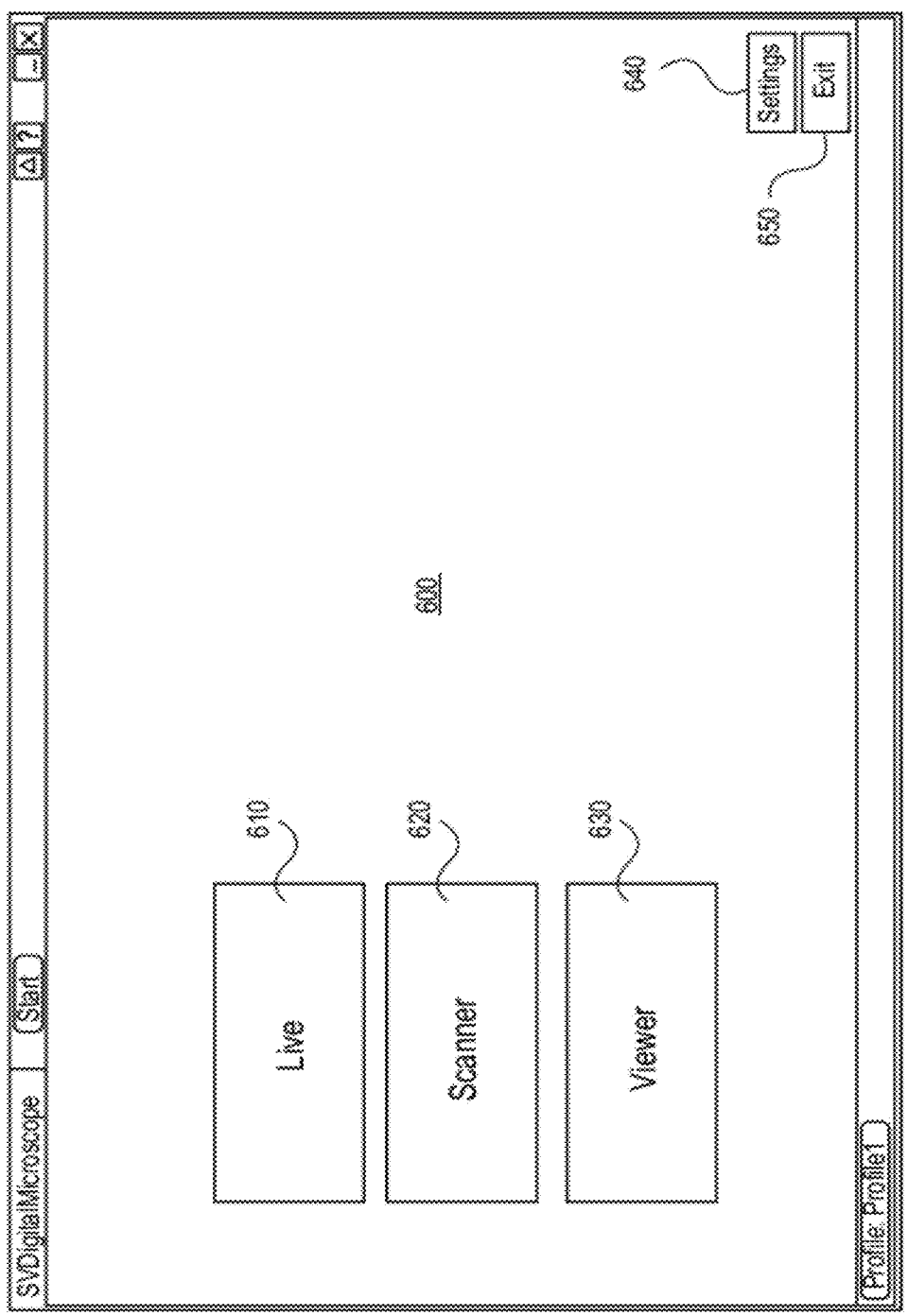
FIG. 9 is an embodiment of a screen shot of a display showing an embodiment of different modes of use of a system including a digital microscope.

FIG. 9 shows an example of a screen shot of display 120 of system 100. This is an example of an entry screen where a user can select a live mode, a scanning mode or a viewing mode. An entry screen may also include an opportunity to enter or modify the basic settings of the instrument by selecting "Settings" 640 as well as an opportunity to exit the system by selecting "Exit" 650.

In the example where a user chooses a live mode by selecting "Live" 610, computer 110 will direct digital microscope 150 to move slide carrier 210 to a loading position, such as by extending slide carrier 210 out of the instrument so it is accessible by a user. At this time, when slide carrier 210 is accessible, computer 110 may indicate that the slide carrier may be removed from digital microscope 150 and loaded with one or more slides. One way to indicate this is by an announcement on monitor 120 (block 505, FIG. 8).

In the embodiment where slide carrier 210 has four slide cavities (slide cavities 220A, 220B, 220C and 220D), a user may place up to four slides onto slide carrier 210. After placing one or more slides on slide carrier 210, the carrier is loaded into the instrument and the instrument pulls the carrier inside and senses its presence and location (block 510, FIG. 8).

Once slide carrier 210 is placed within digital microscope 150, system 100 determines the number and position of slides inserted into slide cavities 220A, 220B, 220C and/or 220D (block 515, FIG. 8). System 100 selects each slide for imaging (block 520, FIG. 8). System 100 then aligns a selected slide and sensor 160/optical imaging sub-system 168 (block 520, FIG. 8). If a selected slide has been reinserted into the instrument and information of a previous session needs to be correlated, system 100 determines the rotation and shift of the selected slide with respect to a previous session. In one embodiment, sensor 160 initially senses an image or images of a sample on each slide without magnification or with a magnification of less than one (block 530, FIG. 8). The sensed image along with a separately sensed image of a label on the slide may then be displayed (block 535, FIG. 8). A low-resolution overview image of all inserted slides and of their labels is then taken.

Figure 10:
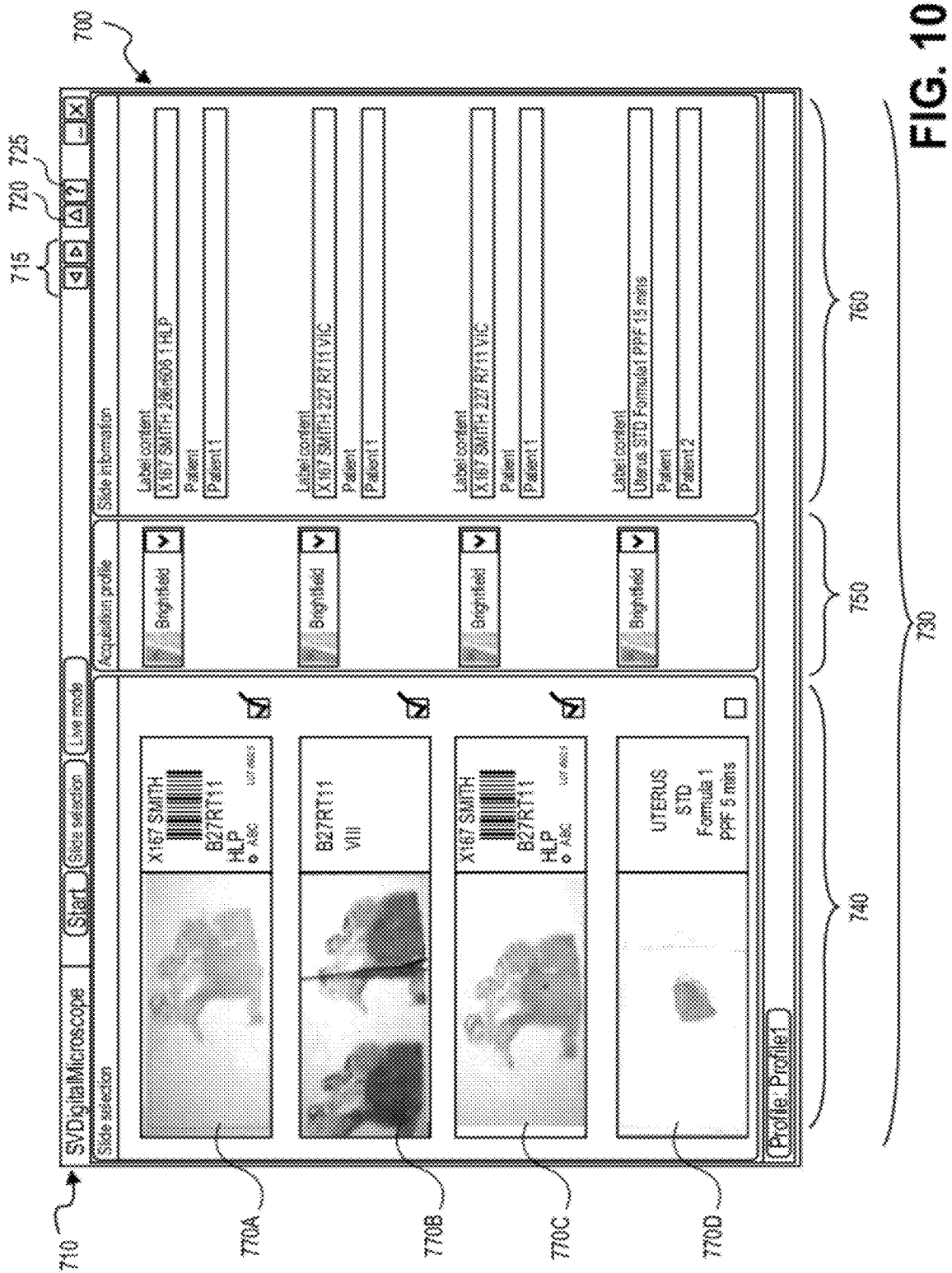
FIG. 10 is an embodiment of a screen shot of a display showing low-resolution images of four slides and their labels.

The screen shot in FIG. 10 is an embodiment of a slide selection graphical user interface (GUI). In GUI title bar 710, the steps for the workflow are illustrated and the current step ("slide selection") highlighted. To the right of these tabs (as viewed), the title bar includes controls to move within of the workflow (buttons 715), to eject the slide carrier (button 720) or to get assistance (button 725).

Main part 730 of screen 700 is divided into slide selection section 740, profile selection section 750 and slide information section 760. Slide selection section 740 shows a sketch of slide carrier 180 (see FIG. 2). In the occupied cavities of slide carrier 180, overview images 770A, 770B, 770C and 770D of slides in slide cavities 220A, 220B, 220C and 220D, respectively (see FIG. 2), as well as the labels of the respective slides can be seen. The GUI allows a user to select and group correlated slides. In one embodiment, grouped slides are scanned and simultaneously displayed. This feature allows the user to, for example, compare structures of different slides of the same group. A group of slides may be referred to as a case. In the "live mode," a user is able to add pre-scanned, stored slides to a case. For example, in addition to any slides present on slide carrier 180 within digital microscope 150, computer 110 of system 100 may store previously captured (saved) images (e.g., overview image, magnified image) referred to as scanned images of slides that are no longer present.

Referring to profile selection section 750 of the GUI, the section allows the user to select specific, predefined scanned profiles that are optimized and customized image acquisitions for a specific stain or, in an embodiment utilizing fluorescent image, a fluorescence number. For example, a specific profile for an H&E stain might be a 20× image. Section 750 allows a user to select the tool bar and be offered a choice of a 20× view and scan. Slide and label information is presented in slide information section 760 and provides, in one embodiment, identifying information about the patient as well as the process step(s) that a sample was subjected to in preparing it for microscopic analysis.

Referring to the screen shot in FIG. 10, options to proceed include starting a "live mode" of a single slide or a group of slides or ejecting the slide carrier (slide carrier 180). In a "live mode," further images (e.g., magnified images) of a slide or a group of slides may be sensed and/or captured (saved).

Figure 11:
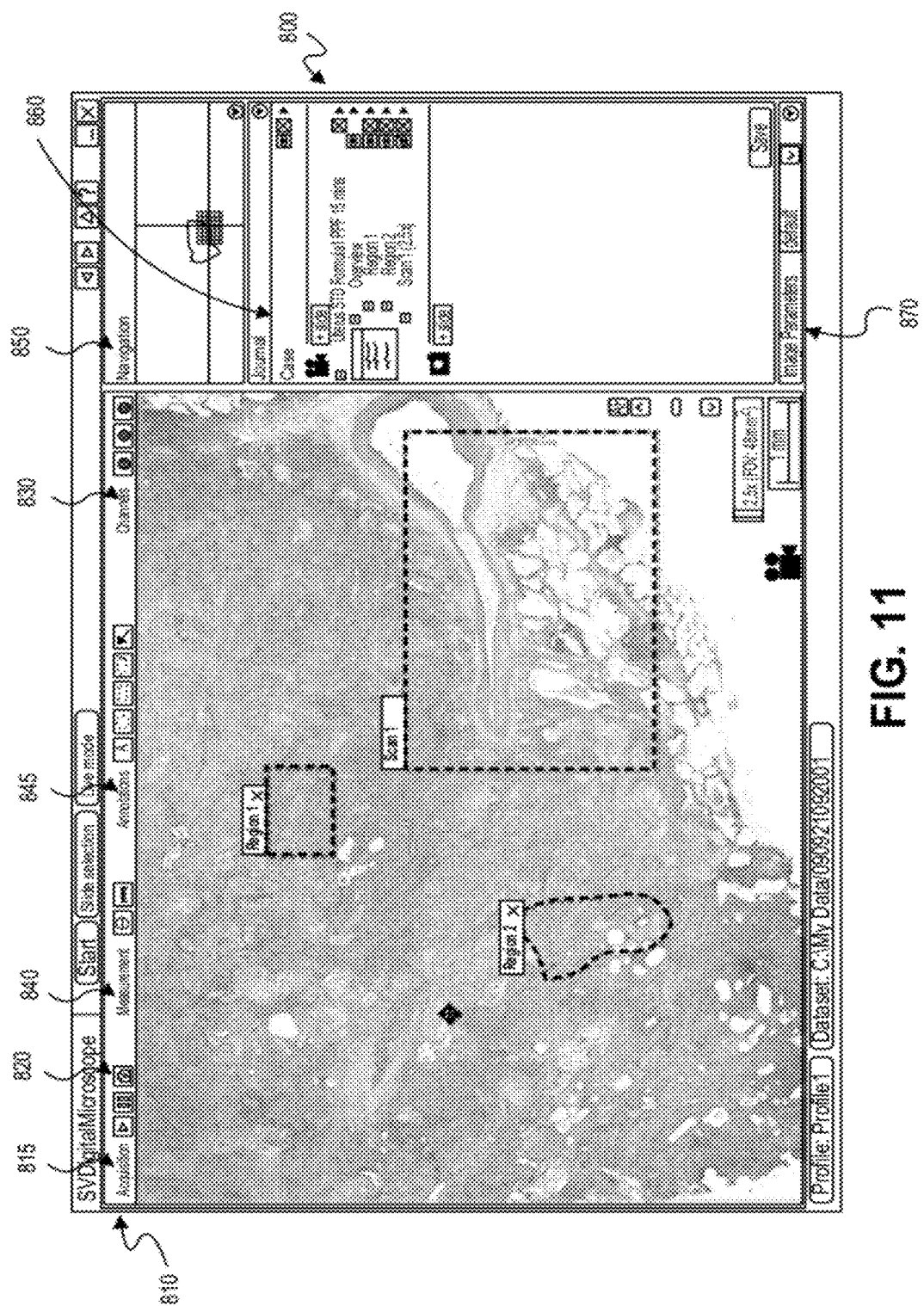
FIG. 11 is an embodiment of a screen shot of a display showing a portion of a sample in a live mode.
Figure 12:
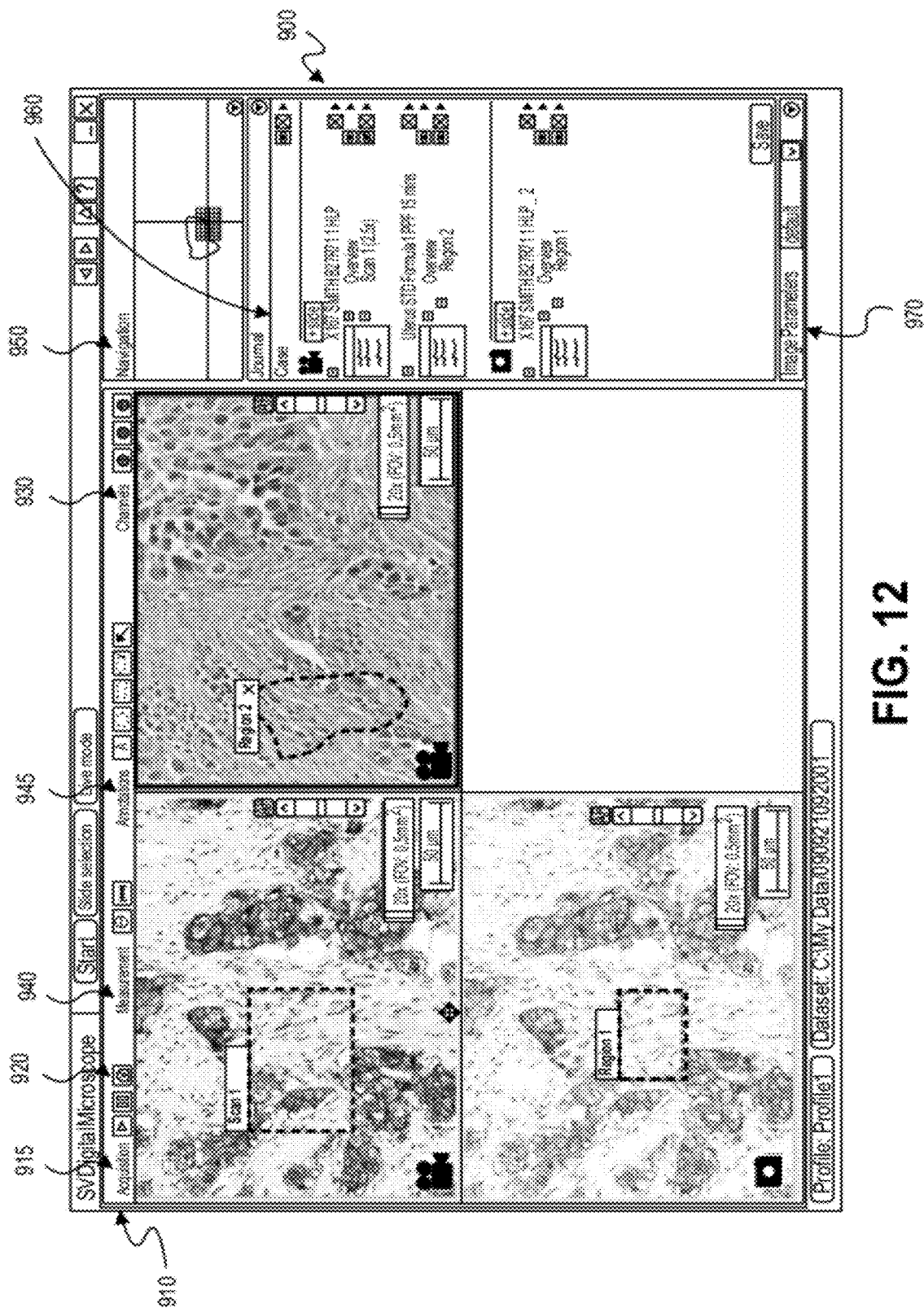
FIG. 12 is an embodiment of a screen shot of a display showing a portion of three different samples in a live mode.

In an instance where a user selects a "live mode," a user may select a particular slide or slides based on the displayed overview images (block 540, FIG. 8). FIG. 11 and FIG. 12 show typical user interface screens. While FIG. 11 illustrates the screen with a single image or scan, FIG. 12 shows views of three different images or scans. The image in FIG. 11 is a live image (indicated video icon in right corner, as viewed). The screen is divided into different areas. The two upper images (as viewed) are live images (see video icon) and the lower image is a saved (scanned) image (see camera icon). System 100 is able to show saved tissue images (tissue scans) and live images of slides that are in digital microscope 150 as well as stored tissue scans of pre-scanned slides. In one embodiment, for "live" images of slides present in digital microscope 150, sensor 160 continuously acquires (refreshes) images at the current position of the microscope at a rate of several images/second (block 545, FIG. 8). For example, if a sensor last sensed a sample on a slide in slide cavity 220A and no further activity by a user or system 100 has been dictated, sensor 160 will remain over the slide in slide cavity 220A and refresh that image at a rate of, for example, six images/second. In one embodiment, only the sample of the image is refreshed, not the associated label. Although FIG. 11 shows a single scan and FIG. 12 shows three scans, up to 16 scans can be viewed simultaneously. In such case, the view is split to show all selected scans. In another embodiment, images from a case can be displayed on more than one screen.

Views can be added and removed from the screen via selection in a journal. The journal is a collection of all objects in a case and can be found on the right hand side of the screen. At the same time, only one view is active. All controls reflect the setting of the active view. Any operation will only affect this specific image. The images from the other scans are "frozen." To switch focus to another slide, the user needs to click on one of the displayed images or a label in the journal.

In title bars 810 and 910 of the screen shots shown in FIG. 11 and FIG. 12, respectively, system 100 offers the following controls:

| CONTROL | DESCRIPTION |
| --- | --- |
| Start/stop acquisition 815/915: | Image acquisition gets stopped/continued. |
| Snap 820/920: | Capture current image from the selected slide. The image can be saved or exported. |
| Color channel selection 830/930: | Switch on/off color channels. |
| Distance/area measurement tools 840/940: | Calibrated tools to measure actual distances and areas on the sample. |
| Annotations and annotation setting 845/945: | Using these tools, the user is able to add comments to the image with different object (e.g., text, square, arrow). |
| HR scan regions: | Defines regions which will be scanned using the selectable high resolution (HR) optics. For regions smaller than a camera tile, the software immediately acquires and displays the image (i.e., no stitching required). However, if the selected region is larger than a camera tile, the region will be stitched and scanned. |

In each view, the magnification of the image, a scale indicator and a focus control may be displayed.

FIG. 11 shows a single image at 2.5× magnification. A user can indicate regions of interest or desired scans by maneuvering mouse 1400A or mouse 1400B over an area (see e.g., Scan 1, Region 1, Region 2). FIG. 12 shows these areas at 20×.

Using keyboard 130, mouse 1400A or 3D mouse 1400B, the user is able to navigate within the scanned image data (block 550, FIG. 8). The following actions are possible:

| ACTION | DESCRIPTION |
| --- | --- |
| Zoom: | Digitally zoom in/out of the displayed image. For slides, which are physically in the instrument, a user may digitally zoom in and out of the displayed image. The zooming in and out initially causes system 100 to modify the sensor to display pixel ratio (block 565, FIG. 8). As soon as a microscope objective can be used to obtain the view (block 570, FIG. 8), the system will automatically use the optimal magnification for a specific zoom level. At this point, a user may again zoom in and out by initially changing a sensor to display pixel ratio and then an objective where a higher magnification is desired. |
| Pan: | Pan around the sample to display neighboring areas. If a user examines different slides in digital microscope 150, system 100 will move the sample accordingly. |
| Focus: | In the live image mode, a user is able to change the focus of the instrument. It is possible to trigger an autofocus and to manually adjust the focus with respect to a nominal position. In the case of a pre-scanned z-stack scan (i.e., scans of different depths into the tissue, a user can change the focal plane within the z-stack. |

Each view can be viewed in a full screen mode. In this mode, the total screen is covered by the view. Only the magnification of the image, scale indicator and the navigation control are displayed in the image. A user can leave this total screen view mode by selecting (pushing) the "esc" key on keyboard 130.

At any time during the navigation, a user may save the displayed image (block 560, FIG. 8).

On the right hand side of the GUI in FIG. 11 and FIG. 12, display 120 shows navigation control 850/950, journal 860/960 and image parameter control 870/970.

Navigation control 850/950 shows an overview image of the active slide. The control indicates the position of the active view (e.g., the live image that can be refreshed at a desired refresh rate). By clicking on the control, the position can be moved. The control also indicates the positions of the annotations and scans which have been added to the slide.

Below navigation control 850/950, journal 860/960 is located. Journal 860/960 represents the structure of a case. In one embodiment, journal 860/960 contains slide information, annotations and comments of all slides in a case. Slides can be added and removed from the case. The slides are grouped into two parts. In the upper part of the list, slides in the instrument can be found. A user can examine these slides live. In this case, the user can add scans to these slides by scanning selected areas of the slides. In the lower part of the list (as viewed), pre-scanned slides from the memory in computer are presented.

In the structure of journal 860/960, each slide has by default three objects: a label image, the slide information and an overview image. The user can add additional objects (annotations, comments, bookmarks and high-resolution scans) to the journal. A user can choose one of the entries in journal 860/960 to jump to a specific image position.

In one embodiment, journal 860/960 will be a starting point for evaluation of specific regions or for the creation of a report of the considered case. Journal 860/960 also contains the "save session" button. By selecting this button, system 100 will store the session (including all slides, annotations and setting) to memory in computer 110. The file contains the labels, the overview image and the high-resolution scans, which are defined in the journal. A user can restore the session at a later time.

Below journal 860/960 in FIG. 11 and FIG. 12, image parameter control 870/970, in one embodiment, is located. Image parameter control 870/970 allows the acquisition parameters of the camera (exposure time, camera gain, etc.) and the image settings (brightness, contrast, color balance, black/white balance, image filters (sharpness, etc.)) to be modified. A user can save settings, for example, a specific staining. Afterwards, the user can access these settings without unfolding the controls.

Following optional modification of image parameters, a user may save the session. A user may also abort the session. If a user decides to abort the session, the user exits the live mode. If the user has modified entries in journal 860/960, which are not saved yet, system 100 will ask the user, if the user wants to save the session. Subsequently, system 100 moves to the "slide (group) selection" screen. The user can continue with the next slide(s).

Figure 13:
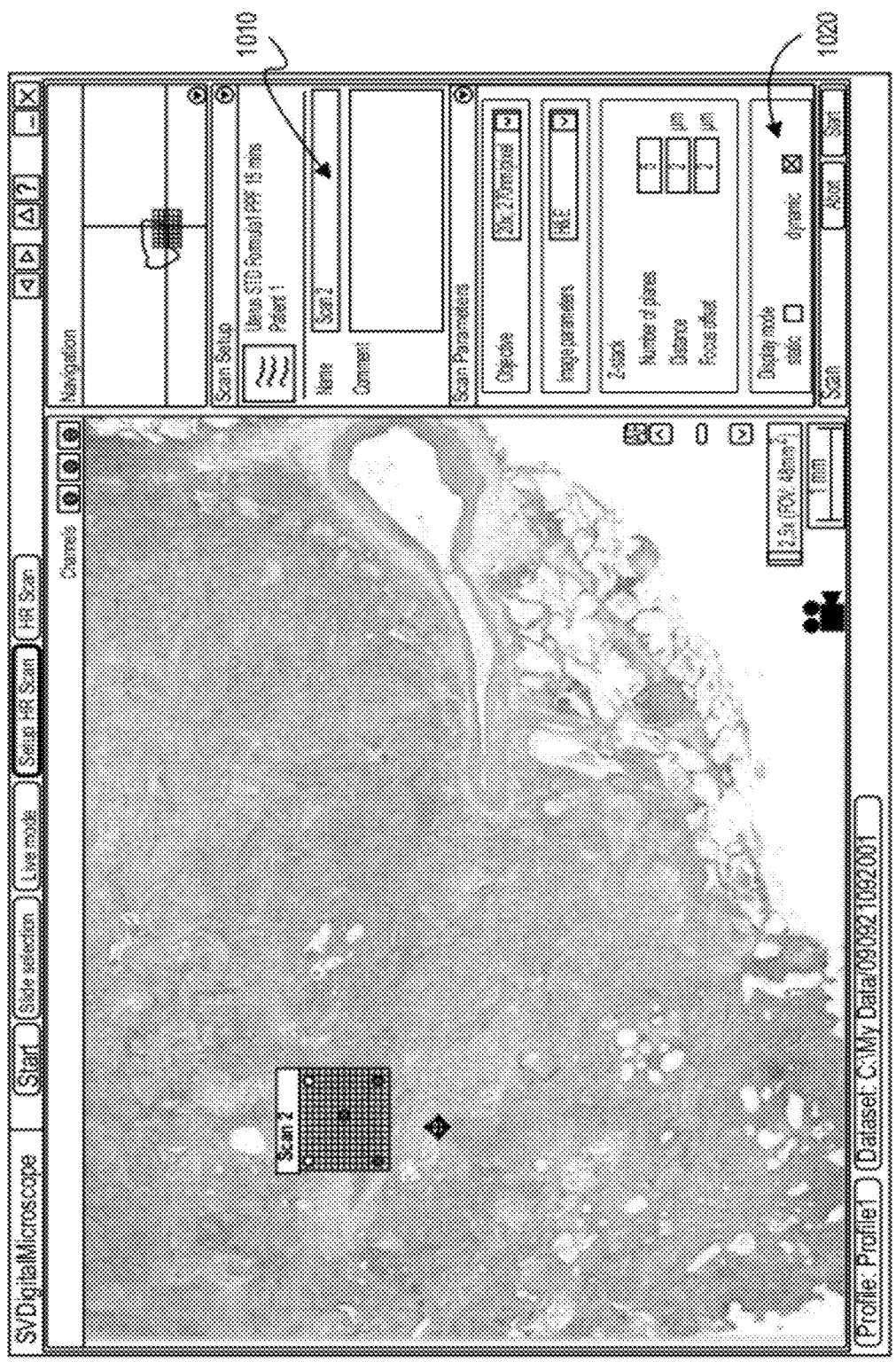
FIG. 13 is an embodiment of a screen shot of a display showing a portion of a single sample during a high-resolution scan.

If a user has defined a high-resolution scan region in the live mode, the high-resolution scan function is accessed. Before the scan starts, the user selects the scan parameters (resolution, acquisition parameters and z-stack parameters). FIG. 13 shows an embodiment of a screen shot on display 120 where scan parameters are established. The user can name and comments about the scan. In area 1020, the user can choose the scan display mode. The scan display mode describes how system 100 will show individual camera fields of view or tiles during a scan. The user can either follow the scan tile by tile or view the entire scan while it builds up. In the latter case, the user is able to pan and zoom in the recorded image data during the scan.

Figure 14:
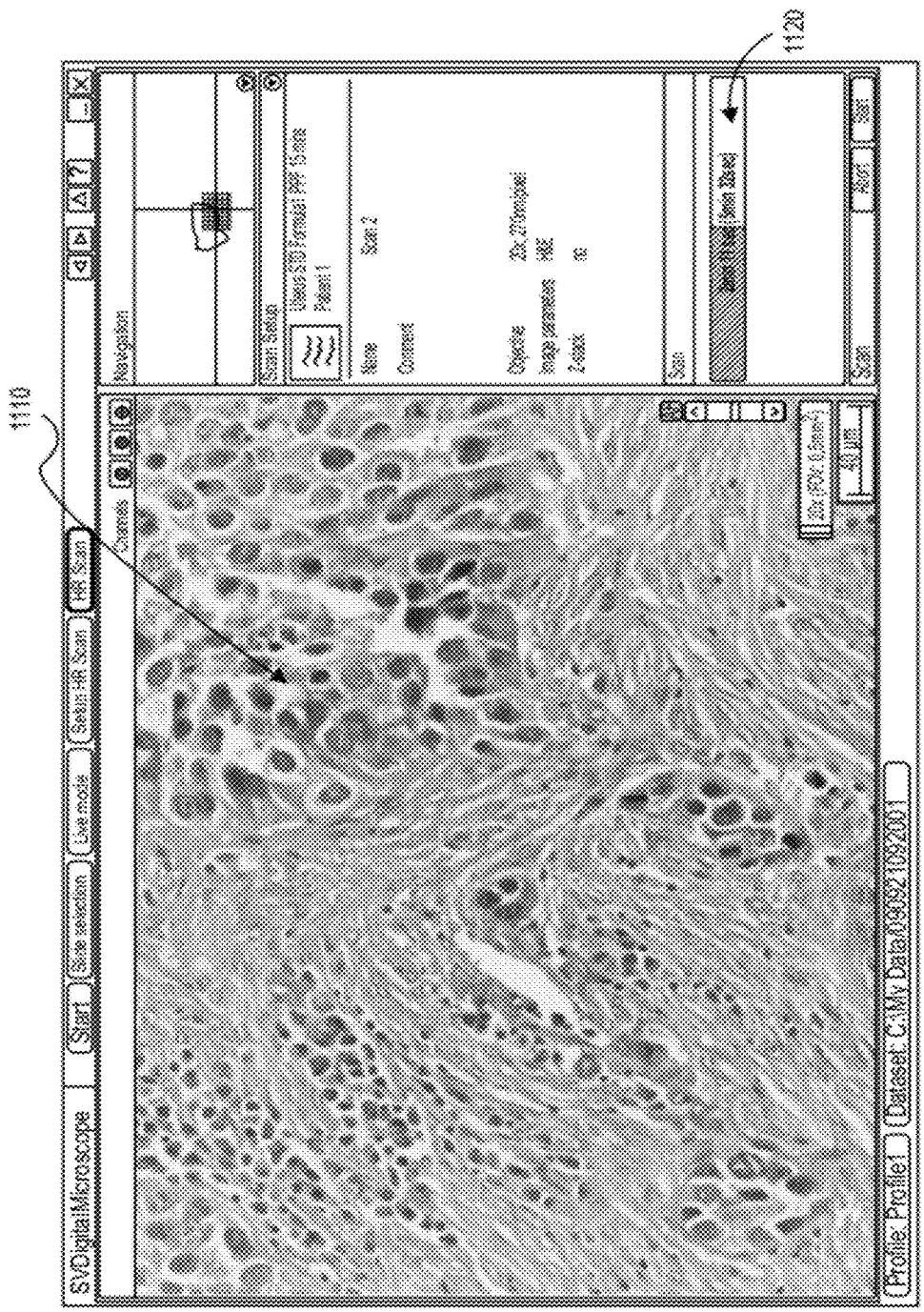
FIG. 14 is an embodiment of a screen shot of a display showing a portion of a single sample during a high-resolution scan.

After the high-resolution scan is started, system 100 moves to the high-resolution scan display. FIG. 14 shows a screen shot of an embodiment of a high-resolution scan display. Depending on the selected display mode, system 100 either shows the current tiles or the entire scan area 1110. In the latter case, a user is able to zoom and pan within the recorded data, while the screen builds up. The high-resolution scan display also indicates progress 1120 of the scan screen.

Following a high-resolution scan, system 100 automatically reverts to the "live mode" screen. The completed scan is inserted into the journal and is located below the corresponding slide.

In another embodiment, system 100 can be directed to perform scans of multiple slides, such as high-resolution scans of each slide in slide carrier 180. An embodiment where slide carrier 180 holds four slides, a user places up to four slides onto slide carrier 180 and inserts the carrier digital microscope 150. Digital microscope 150 pulls slide carrier 180 inside and determines the slide carrier type, the number of slide and their positions. Automatic scanning of more than four slides is possible in combination with, for example, an external slide loader. In that case, system 100 would communicate with the slide loader so that slides to be scanned are automatically loaded and retrieved. For example, a commercially available slide loader can be associated with digital microscope 150. Such slide loaders are configured to receive and transfer slides. Accordingly, a transfer mechanism of a slide loader can load a slide or slides onto slide carrier 210 and a transfer mechanism (e.g., pick and place robotic grabber) associated with or connected to digital microscope 150 can return slides to the slide loader after scanning. The control of transferring, scanning and imaging may be controlled by controller 110.

In an automatic or reflex imaging mode, system 100 may be instructed to acquire scans of either the complete slide or of selected areas of the slide can be accomplished immediately or at a later time as selected by the user. Scanning of the slides in the reflex imaging mode is facilitated by an automatic slide loader. In addition, to select complete or partial slide scans, a user may select the scan parameters such as, but not limited to, magnification and z-stack. In addition, a user can select more than one scan at different magnifications or using other user-defined parameters. Default scan parameters can be programmed into system 100 to reflect differences between clinicians and/or tissue types. Completion of the reflex imaging of a slide or group of slides, as in a case, may be automatically signaled to one or more devices, for example, via internet connection 145 and to the computer 110 to enable rapid sign-out of the cases (see FIG. 1).

System 100 presents a user with selections for the scanning resolution and the predefined image parameter set such as described above in the live mode. Moreover, the user can define z-stack parameters (number of planes, distance between the planes and the focus offset from the focal plane).

The user can modify the save parameters (file name and scan directory). The default parameters are defined in the system settings. In the case of the file name, the user can either use the label content or define a file name. If a name is defined, in one embodiment, system 100 will add a progressive number to distinguish between the slides.

After defining the scan parameters, system 100 starts to scan slide carrier 180 slide by slide. For each slide, a low-resolution overview image and the label image are taken. Following the capture of overview and label images for each slide, system 100 will capture high-resolution images. In one embodiment, the GUI on display 120 will change to the first high-resolution scan screen. System 100 may depict the overview and the label image of current slide. It automatically identifies the tissue regions on the slide and indicates the detected tissue regions in the overview image. Subsequently, the focal plane for the tissue regions on the slide is determined. The progress of these steps is indicated on the screen.

In one embodiment, during the actual scan of the detected tissue regions, system 100, depending on the system settings, in one embodiment, display 120 displays either the image of the current scan position or shows the entire current scan region, in which the image builds up.

The scanned high-resolution images for a slide are stored in memory of computer 110 and can be accessed later by a user using the viewing mode. After all tissue regions on the slide are scanned, system 100 proceeds with the next slide. After all slides have been scanned, system 100 ejects slide carrier 180 and moves to the entry screen.

In a viewing mode, a user can retrieve and view stored images of previously scanned samples (slides) including multiple slides that may make up a case. In this manner, a user can view the images from display 120 directly connected to computer 110 and optical microscope 150. Alternatively, through intranet/internet connection 145 (FIG. 1), a user can access a memory of system 100 and view images remotely. Intranet/internet connection 145 of system 100 also allows images to be sent from one location to another (e.g., via email).

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
    sensing an image at a first magnification of one or less of a portion of a tissue sample on a substrate with a sensor;
    without storing the sensed image,
        displaying at least a portion of the sensed image on a display at a sensor to display pixel ratio greater than one to one;
    in response to user input, performing each of the following:
        electronically modifying the sensor to display pixel ratio at which the sensed image is displayed on the display at the first magnification, and
        when the sensor to display ratio reaches a threshold at the first magnification, automatically sensing a view of an area of the portion of the tissue sample at a second magnification in response to an attempt to modify the sensor to display pixel ratio beyond the threshold ratio; and
    performing at least one of the following:
        refreshing the at least a portion of the sensed image that is displayed at a computer controlled rate, and
        storing the at least a portion of the sensed image that is displayed.

2. The method of claim 1, wherein displaying the sensed image of a portion of a tissue sample comprises assembling a plurality of segments of the portion and displaying the assembled plurality of segments.

3. The method of claim 2, wherein a segment of the plurality of segments overlaps an adjacent segment and assembling the adjacent segments comprises aligning common image content in the adjacent segments.

4. The method of claim 2, wherein the displaying the sensed image comprises displaying an entire cross-sectional area of the image.

5. The method of claim 1, wherein storing the sensed image comprises storing in response to user input.

6. The method of claim 1, wherein electronically modifying a sensor to display pixel ratio comprises transitioning from a ratio greater than one to one to a ratio of one to one.

7. The method of claim 1, wherein the view of the area of the portion of the tissue sensed at the second magnification corresponds to an area selected by the user input.

8. The method of claim 1, further comprises sensing an image of a label on the substrate and displaying the image on the display.

9. The method of claim 8, wherein sensing an image of a tissue sample on a substrate comprises sensing a bright field image and sensing an image of a label comprises sensing an image using reflectance.

10. The method of claim 1, further comprising displaying on the display at least one of the modified sensor to display pixel ratio view and the view at the second magnification.

11. The method of claim 10, concurrently displaying on the display each of the sensed image on a display at a sensor to display pixel ratio greater than one to one and the at least one of the modified sensor to display pixel ratio view and the view at the second magnification.

12. The method of claim 1, further comprising providing a plurality of substrates wherein each of the plurality of substrates comprises a tissue sample and, prior to sensing an image, the method further comprises designating at least one of the plurality of substrates for sensing.

13. The method of claim 1, further comprising providing a plurality of substrates wherein each of the plurality of substrates comprises a tissue sample and, displaying on the display at least one image of one of the plurality of substrates and at least one image of another of the plurality of substrates.

14. The method of claim 1, further comprising simultaneously displaying on the display at least one image of at least one area of the portion of the tissue sample.

15. The method of claim 1, wherein displaying comprises displaying a first image and a second image on the display and refreshing the sensed image comprises refreshing only one of the first image and the second image.

16. The method of claim 15, wherein the other of the first image and the second image is an image retrieved from a computer memory storage.

17. The method of claim 1, wherein performing comprises storing at least a portion of the sensed image in a data structure and the method further comprises:
sensing an image of the sample at the second magnification that is a magnification greater than one; and
storing the sensed image at the second magnification in the data structure.

18. The method of claim 1, wherein performing comprises storing the at least a portion of the sensed image in a data structure, wherein the storing comprises storing a hierarchy of images based on a sensor to display pixel ratio.

19. The method of claim 1, further comprising locating an area in an image based on a pixel size of the sensed image, a magnification and the number of pixels.

20. The method of claim 19, associating the area of the sensed image with an annotation provided by the user and storing a location of the area and the annotation in a data structure.

21. The method of claim 1, wherein the tissue sample on a substrate is a sample on a slide, the slide having a label and positioned on a stage performing comprises storing at least a portion of the sensed image, the method further comprising in response to a removal from and subsequent return of the slide to the stage, orienting a position of the tissue sample relative to its position prior to removal.

22. An apparatus comprising:
a digital microscope comprising:
at least one image sensor;
a stage configured to support at least one microscope slide;
a first optical imaging sub-system disposed between the at least one sensor and the stage, the first optical imaging sub-system configured to project an image with a magnification of one or less; and
a second optical imaging sub-system disposed between the at least one sensor and the stage, the second optical imaging sub-system configured to project an image with a magnification greater than one;
an illumination sub-system comprising at least one light source; and
a computer coupled to the digital microscope and operable to direct an image capture by the at least one image sensor of a portion of a microscope slide on the stage, a display coupled to the computer and operable to display an image transmitted from the computer, wherein the computer comprises machine-readable instructions that when executed, the computer is operable to direct an image capture through the second optical imaging sub-system in response to an attempt by a user to modify a sensor to display pixel ratio of an image beyond a threshold through the first optical imaging sub-system.

23. A non-transitory computer-readable medium containing instructions that when executed perform a method comprising:
sensing an image at a first magnification of one or less of a portion of a tissue sample on a substrate with a sensor;
without storing the sensed image,
displaying at least a portion of the sensed image on a display at a sensor to display pixel ratio greater than one to one;
in response to user input, performing each of the following:
electronically modifying the sensor to display pixel ratio of the sensed image at the first magnification, and
when the sensor to display ratio reaches a threshold at the first magnification, automatically sensing a view of an area of the portion of the tissue sample at a second magnification in response to an attempt to modify the sensor to display pixel ratio beyond the threshold ratio; and
performing at least one of the following:
refreshing the at least a portion sensed image that is displayed at a computer controlled rate, and
storing at least a portion of the sensed image that is displayed.

24. The computer-readable medium of claim 23 wherein displaying the sensed image of a portion of a tissue sample comprises assembling a plurality of segments of the portion and displaying the assembled plurality of segments.

25. The computer-readable medium of claim 23, wherein modifying the sensor to display pixel ratio, comprises transitioning from a ratio greater than one to one to a ratio of one to one in response to user input.

26. The computer-readable medium of claim 23, wherein an area of the portion of the tissue sensed at the second magnification corresponds to an area selected by the user input.

27. The computer-readable medium of claim 23, wherein performing comprises storing at least a portion of the sensed image in a data structure and the method further comprises:
sensing an image of the sample at the second magnification; and
storing the sensed image at the second magnification in the data structure.

28. The computer-readable medium of claim 23, wherein performing comprises storing the at least a portion of the sensed image in a data structure, wherein the storing comprises storing a hierarchy of images based on a sensor to display pixel ratio.

29. The computer-readable medium of claim 23, further comprising locating an area in an image based on a pixel size of the sensed image, a magnification and the number of pixels.

30. The computer-readable medium of claim 29, associating the area of the sensed image with an annotation provided by the user and storing a location of the area and the annotation in a data structure.

31. The computer-readable medium of claim 23, wherein the tissue sample on a substrate is a sample on a slide, the slide having a label and positioned on a stage performing comprises storing at least a portion of the sensed image, the method further comprising in response to a removal from and subsequent return of the slide to the stage, orienting a position of the tissue sample relative to its position prior to removal.

32. A method comprising:
sensing an image at a first magnification of one or less of a portion of a tissue sample on a substrate with a sensor;
without storing the sensed image,
displaying at least a portion of the sensed image on a display; and
performing each of the following:
electronically modifying a sensor to display pixel ratio at which the sensed image is displayed on the display at the first magnification; and
when the sensor to display ratio reaches a threshold at the first magnification, automatically displaying a magnified view of an area of the portion of the tissue sample at a second magnification in response to an attempt to modify the sensor to display pixel ratio beyond the threshold ratio.

33. The method of claim 32, further comprising storing the sensed image.

34. The method of claim 32, wherein modifying a sensor to display pixel ratio comprises transitioning from a ratio greater than one to one to a ratio of one to one.

35. The method of claim 32, wherein an area of the portion of the tissue sensed by the second magnification corresponds to an area selected by the user input.

36. The method of claim 32, further comprises sensing an image of a label on the substrate and displaying the image on the display.

37. The method of claim 36, wherein sensing an image of a tissue sample on a substrate comprises sensing a bright field image and sensing an image of the label comprises sensing an image using reflectance.

38. A method comprising:
sensing an image of a portion of a tissue sample on a substrate at a first magnification with a sensor;
without storing the sensed image,
displaying at least a portion of the sensed image on a display at the first magnification at a sensor to display pixel ratio greater than one to one; and
in response to user input, performing each of the following in response to user input:
electronically modifying the sensor to display pixel ratio at which the sensed image is displayed on the display at the first magnification, and
when the sensor to display ratio reaches a threshold sensor at the first magnification, automatically sensing of an area of the portion of the tissue sample at a second magnification that is greater than the first magnification in response to an attempt to modify the sensor to display pixel ratio beyond the threshold ratio; and
performing at least one of the following:
refreshing the at least a portion of the sensed image that is displayed at a computer controlled rate, and
storing the at least a portion of the sensed image that is displayed.

39. The method of claim 38, wherein storing the sensed image comprises storing in response to user input.

40. The method of claim 38, wherein modifying a sensor to display pixel ratio comprises transitioning from a ratio greater than one to one to a ratio of one to one in response to user input.

41. The method of claim 38, wherein an area of the portion of the tissue sensed by the magnified view corresponds to an area selected by the user input.

42. The method of claim 38, further comprising displaying on the display at least one of a modified sensor to display pixel ratio view and a second magnification view.

43. The method of claim 42, concurrently displaying on the display each of the sensed image on a display at a sensor to display pixel ratio greater than one to one and the at least one of a modified sensor to display pixel ratio view and a second magnification view.

44. The method of claim 38, further comprising providing a plurality of substrates wherein each of the plurality of substrates comprises a tissue sample and, prior to sensing an image, the method further comprises designating at least one of the plurality of substrates for sensing.

45. The method of claim 38, further comprising providing a plurality of substrates wherein each of the plurality of substrates comprises a tissue sample and, displaying on the display at least one image of one of the plurality of substrates and at least one image of another of the plurality of substrates.

46. The method of claim 38, wherein performing comprises storing at least a portion of the sensed image in a data structure and the method further comprises:
sensing an image of the sample at an optical magnification greater than one; and
storing the sensed image at the optical magnification greater than one in the data structure.

47. The method of claim 38, wherein performing comprises storing the at least a portion of the sensed image in a data structure, wherein the storing comprises storing a hierarchy of images based on a sensor to display pixel ratio.

48. An apparatus comprising:
a digital microscope comprising:
at least one image sensor;
a stage configured to support at least one microscope slide;
an optical imaging sub-system disposed between the at least one sensor and the stage, the optical imaging sub-system comprising at least a first objective having a first magnification and a second objective having a second magnification that is greater than the first magnification;
an illumination sub-system comprising at least one light source;
a computer coupled to the digital microscope and operable to direct an image capture by the at least one image sensor of a portion of a microscope slide on the stage; and
a display coupled to the computer and operable to display an image transmitted from the computer,
wherein the computer comprises machine-readable instructions that when executed, will cause the computer to automatically direct an image capture through the second objective in response to an attempt to electronically modify a sensor to display pixel ratio of a sensed image beyond a threshold ratio.

49. The apparatus of claim 48, wherein the first objective and the second objective are associated with a first imaging sub-system, the microscope further comprising:
a second imaging sub-system comprising a third objective having a magnification less than the first magnification and the second magnification; and
a mirror,
wherein the light source is operable to emit light through an opening in the stage and the mirror is operable to direct light emitted through the opening in the stage to the third objective.

50. A method comprising:
sensing an image of a portion of a tissue sample on a substrate at a first magnification with a sensor;
without storing the sensed image,
displaying at least a portion of the sensed image on a display at the first magnification; and
performing each of the following:
electronically modifying a sensor to display pixel ratio at which the sensed image is displayed on the display at the first magnification; and
when the sensor to display ratio reaches a threshold at the first magnification, automatically displaying a view of an area of the portion of the tissue sample at a second magnification that is greater than the first magnification in response to an attempt to modify the sensor to display pixel ratio beyond the threshold ratio.

* * * * *